United States Patent
Nozawa

(10) Patent No.: US 11,968,457 B2
(45) Date of Patent: Apr. 23, 2024

(54) IMAGING APPARATUS, IMAGING SYSTEM, AND IMAGING METHOD

(71) Applicant: Panasonic Intellectual Property Management Co., Ltd., Osaka (JP)

(72) Inventor: Katsuya Nozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 9 days.

(21) Appl. No.: 17/695,728

(22) Filed: Mar. 15, 2022

(65) Prior Publication Data
US 2022/0210310 A1 Jun. 30, 2022

Related U.S. Application Data

(63) Continuation of application No. PCT/JP2020/033860, filed on Sep. 8, 2020.

(30) Foreign Application Priority Data

Oct. 3, 2019 (JP) ................. 2019-183237

(51) Int. Cl.
*H04N 23/56* (2023.01)
*H04N 23/72* (2023.01)

(52) U.S. Cl.
CPC ............. *H04N 23/72* (2023.01); *H04N 23/56* (2023.01)

(58) Field of Classification Search
CPC ........ H04N 23/72; H04N 23/56; H04N 25/50; H04N 23/68
See application file for complete search history.

(56) References Cited

U.S. PATENT DOCUMENTS

| 2008/0246107 A1* | 10/2008 | Maehara | H01L 27/14687 257/E31.127 |
| 2011/0242378 A1* | 10/2011 | Mabuchi | H04N 25/589 348/E5.091 |
| 2016/0330414 A1* | 11/2016 | Takado | H04N 25/77 |
| 2017/0187960 A1* | 6/2017 | Tsuchiya | H04N 23/73 |

(Continued)

FOREIGN PATENT DOCUMENTS

| CN | 107370913 A | 11/2017 |
| JP | 2002-172088 | 6/2002 |
| JP | 2010-175435 | 8/2010 |

(Continued)

OTHER PUBLICATIONS

International Search Report of PCT application No. PCT/JP2020/033860 dated Nov. 17, 2020.

(Continued)

*Primary Examiner* — Mekonnen D Dagnew
(74) *Attorney, Agent, or Firm* — Rimon P.C.

(57) ABSTRACT

An imaging apparatus includes: an imaging device that has variable sensitivity and that acquires images with a sampling cycle; and a control circuit that controls the imaging device. The control circuit changes a sensitivity of the imaging device with a first cycle shorter than the sampling cycle. Based on control of the control circuit, the imaging device acquires a plurality of images of a subject with the sampling cycle. The subject includes a first component that changes with a second cycle different from the first cycle.

17 Claims, 17 Drawing Sheets

(56) References Cited

U.S. PATENT DOCUMENTS

2017/0332025 A1    11/2017  Nozawa et al.
2020/0344429 A1*  10/2020  Kiyamura .............. G03B 15/00

FOREIGN PATENT DOCUMENTS

| JP | 2011-244298 | 12/2011 |
| JP | 2014-207641 | 10/2014 |
| JP | 2017-118595 | 6/2017 |

OTHER PUBLICATIONS

English Translation of Chinese Search Report dated Sep. 28, 2023 for the related Chinese Patent Application No. 202080063796.9.

* cited by examiner

IMAGING APPARATUS, IMAGING SYSTEM, AND IMAGING METHOD

BACKGROUND

1. Technical Field

The present disclosure relates to an imaging apparatus, an imaging system, and an imaging method.

2. Description of the Related Art

Imaging devices (image sensors) are devices in which photoelectric conversion elements for converting light into signal charge are arranged two-dimensionally. It is difficult to simultaneously measure the amounts of signal charge output by all the photoelectric conversion elements. Thus, in each imaging device, after the signal charge generated by the photoelectric conversion elements is accumulated in charge accumulation portions in a period called an exposure time, the signal charge is sequentially measured by an amount-of-charge measuring unit.

Owing to the configuration of the above-described imaging devices, subject's changes that occur in a shorter time than the exposure time are averaged through the accumulation and thus cannot be imaged with sufficient amounts of information. Reducing the exposure time is conceivable in order to image a subject that exhibits quick changes. Imaging devices having such a reduced exposure time are generally referred to as "high-speed imaging devices". For example, Japanese Unexamined Patent Application Publication No. 2014-207641 discloses a high-speed imaging device including image recording portions that are adjacent to photoelectric conversion elements and in which image information is recorded. During imaging, signal charge is accumulated in the image recording portions, and after the imaging, image information is sequentially retrieved therefrom.

SUMMARY

In one general aspect, the techniques disclosed here feature an imaging apparatus including: an imaging device that has variable sensitivity and that acquires images with a sampling cycle Tf; and a control circuit that controls the imaging device. The control circuit changes a sensitivity of the imaging device with a cycle Ts1 shorter than the sampling cycle Tf. Based on control of the control circuit, the imaging device acquires a plurality of images of a subject with the sampling cycle Tf. The subject includes a first component that changes with a cycle Tt1 different from the cycle Ts1.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
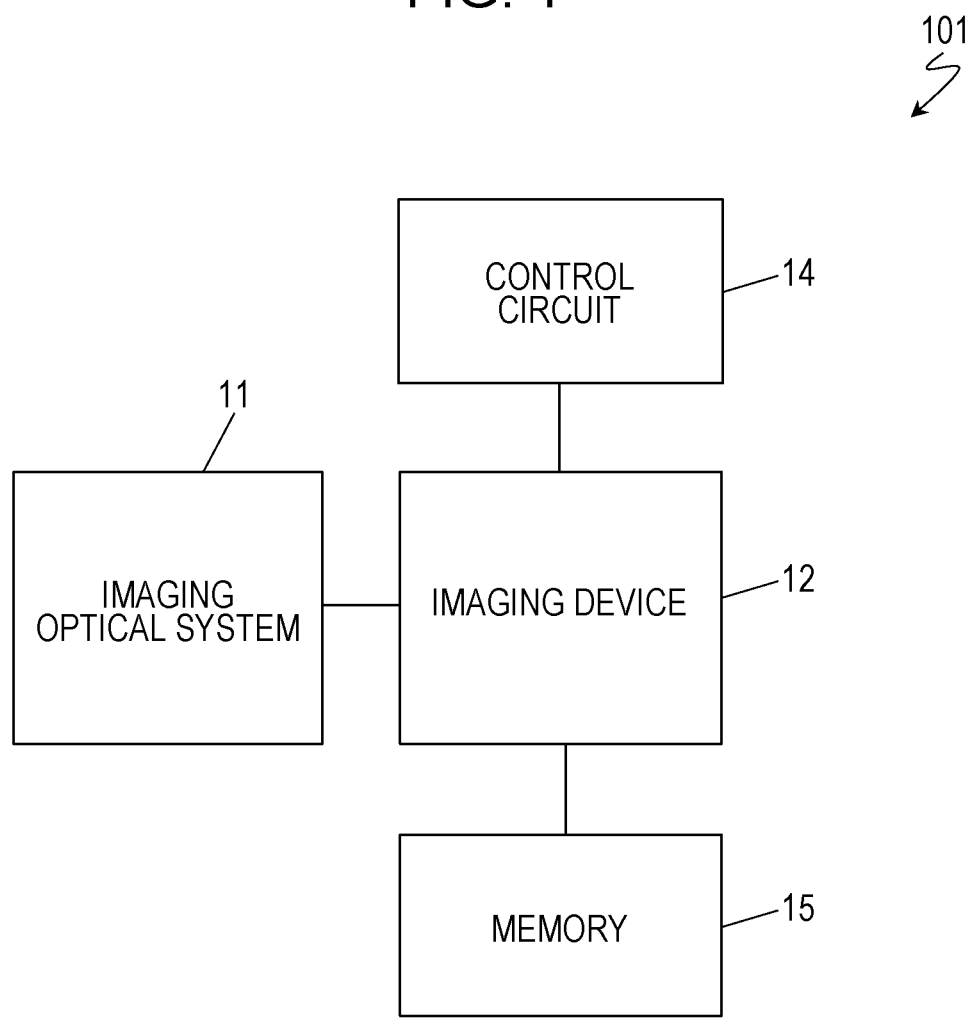
FIG. 1 is a block diagram illustrating a configuration example of an imaging apparatus in a first embodiment of the present disclosure.

High-speed imaging devices generally have special structures in order to image a subject at high speed, and thus the circuit configurations thereof tend to become complicated. Also, for example, when image recording portions are disposed in the vicinity of photoelectric conversion elements, as in the high-speed imaging device disclosed in Japanese Unexamined Patent Application Publication No. 2014-207641, the image recording portions cannot be sufficiently enlarged owing to the configuration, which may cause limitations in the number of frames that can be imaged at a time or the number of pixels. The present disclosure provides an imaging apparatus, an imaging system, and an imaging method that can obtain information on a subject's changes that occur in a short time, by using a simple configuration.

A brief summary of the imaging apparatus, the imaging system, and the imaging method in the present disclosure will be described below.

[Item 1]

An imaging apparatus according to item 1 of the present disclosure includes:

an imaging device that has variable sensitivity and that acquires images with a sampling cycle Tf; and a control circuit that controls the imaging device.

The control circuit changes the sensitivity of the imaging device with a cycle Ts1 shorter than the sampling cycle Tf.

Based on control of the control circuit, the imaging device acquires a plurality of images of a subject with the sampling cycle Tf.

The subject includes a first component that changes with a cycle Tt1 different from the cycle Ts1.

A position or a brightness of the first component may change with the cycle Tt1.

[Item 2]

In the imaging apparatus according to item 1, the plurality of images may include first information that represents a difference frequency component and that is determined by $Tt1 \cdot Ts1/|Tt1-Ts1|$.

[Item 3]

In the imaging apparatus according to item 1 or 2, the sampling cycle Tf may satisfy a relationship given by:

$$2Tf < Tt1 \cdot Ts1/|Tt1-Ts1|.$$

[Item 4]

In the imaging apparatus according to one of items 1 to 3, the subject may further include a second component that changes with a cycle Tt2 different from the cycle Tt1;

the control circuit may change the sensitivity of the imaging device with a cycle Ts2 that is shorter than the cycle Ts1 and that is different from the cycle Ts1;

the plurality of images may further include second information that represents a difference frequency component and that is determined by $Tt2 \cdot Ts2/|Tt2-Ts2|$; and relationships given by $$2Tf < Tt1 \cdot Ts1/|Tt1-Ts1|$$

and $$2Tf < Tt2 \cdot Ts2/|Tt2-Ts2|$$

may be satisfied.

A position or a brightness of the second component may change with the cycle Tt2.

[Item 5]

In the imaging apparatus according to one of items 1 to 3, the subject may further include a second component that changes with a cycle Tt2 different from the cycle Tt1;

the plurality of images may further include third information that represents a difference frequency component and that is determined by $Tt2 \cdot Ts1/|Tt2-Ts1|$; and relationships given by $$2Tf < Tt1 \cdot Ts1/|Tt1-Ts1|$$

and $$2Tf < Tt2 \cdot Ts1/|Tt2-Ts1|$$

may be satisfied.

A position or a brightness of the second component may change with the cycle Tt2.

[Item 6]

In the imaging apparatus according to one of items 1 to 5, the imaging device may be configured to switch between a high sensitivity state and a low sensitivity state during an exposure period; and in the low sensitivity state, the imaging device may have substantially no sensitivity.

[Item 7]

In the imaging apparatus according to one of items 1 to 6, the imaging device may be configured to change the sensitivity during an exposure period between a first value and a second value in a stepwise or continuous manner, the second value being smaller than the first value.

[Item 8]

In the imaging apparatus according to item 6 or 7, the imaging device may include an upper electrode, a lower electrode, and a photoelectric conversion film located between the upper electrode and the lower electrode.

[Item 9]

In the imaging apparatus according to item 8, the imaging device may further include a voltage supply circuit that supplies a voltage to at least one selected from the group consisting of the upper electrode and the lower electrode; and the control circuit may control the voltage supply circuit to cyclically change the sensitivity of the imaging device.

[Item 10]

In the imaging apparatus according to one of items 1 to 9, the imaging device may acquire images according to a global shutter system.

[Item 11]

An imaging system according to item 11 of the present disclosure includes:

the imaging apparatus according to one of items 1 to 10, a signal processing circuit that calculates the cycle Tt1 of the first component, based on the plurality of images.

[Item 12]

An imaging system according to item 12 of the present disclosure includes:

the imaging apparatus according to item 6, an actuator that cyclically applies stress to the subject to change at least one selected from the group consisting of a position of the subject and a shape of the subject.

[Item 13]

An imaging system according to item 13 of the present disclosure includes:

the imaging apparatus according to item 7; and an illumination apparatus that irradiates the subject with first light having a first wavelength and having an intensity that changes with the cycle Tt1.

In the plurality of images, luminance of the first component of the subject changes with the cycle Ts1.

[Item 14]

In the imaging system according to item 13, the illumination apparatus may further irradiate the subject with second light having an intensity that changes with a cycle different from the cycle Tt1 and having a wavelength different from the first wavelength.

[Item 15]

An imaging method according to item 15 of the present disclosure includes:

capturing a plurality of images of a subject with a sampling cycle Tf by using an imaging device whose sensitivity is modulated with a cycle Ts1, the subject including a first component that changes with a cycle Tt1 different from the cycle Ts1; and acquiring the plurality of images.

A position or a brightness of the first component may change with the cycle Tt1.

[Item 16]
In the imaging method according to the item 15,
the plurality of images may include first information that represents a difference frequency component and that is determined by $Tt1 \cdot Ts1/|Tt1-Ts1|$.

[Item 17]
In the imaging method according to item 15 or 16,
the sampling cycle Tf may satisfy a relationship given by:

$$2Tf < Tt1 \cdot Ts1/|Tt1-Ts1|.$$

[Item 18]
In the imaging method according to one of items 15 to 17,
the subject may further include a second component that changes with a cycle Tt2 different from the cycle Tt1;
the imaging device may image the subject through changing the sensitivity with a cycle Ts2 that is shorter than the cycle Ts1 and that is different from the cycle Ts1;
the plurality of images may further include second information that represents a difference frequency component and that is determined by $Tt2 \cdot Ts2/|Tt2-Ts2|$; and relationships given by $$2Tf < Tt1 \cdot Ts1/|Tt1-Ts1|$$

and $$2Tf < Tt2 \cdot Ts2/|Tt2-Ts2|$$

may be satisfied.

A position or a brightness of the second component may change with the cycle Tt2.

[Item 19]
In the imaging method according to one of items 15 to 17,
the subject may further include a second component that changes with a cycle Tt2 different from the cycle Tt1;
the plurality of images may further include third information that represents a difference frequency component and that is determined by $Tt2 \cdot Ts1/|Tt2-Ts1|$; and relationships given by $$2Tf < Tt1 \cdot Ts1/|Tt1-Ts1|$$

and $$2Tf < Tt2 \cdot Ts1/|Tt2-Ts1|$$

may be satisfied.

A position or a brightness of the second component may change with the cycle Tt2.

In the present disclosure, all or a part of circuits, units, apparatuses, devices, members, or portions or all or a part of functional blocks in the block diagrams may be implemented by one or more electronic circuits including a semiconductor device, a semiconductor integrated circuit (IC), or a large-scale integration (LSI). The LSI or IC may be integrated into one chip or also may be constituted by combining a plurality of chips. For example, functional blocks other than a storage element may be integrated into one chip. Although the name used herein is an LSI or IC, it may also be called a system LSI, a very large-scale integration (VLSI), or an ultra large-scale integration (VLSI) depending on the degree of integration. A field-programmable gate array (FPGA) that can be programmed after manufacturing an LSI or a reconfigurable logic device that allows reconfiguration of the connection relationship inside the LSI or setup of circuit cells inside the LSI can also be used for the same purpose.

In addition, functions or operations of all or a part of circuits, units, apparatuses, devices, members, or portions can be executed by software processing. In this case, software is recorded on/in one or more non-transitory recording media, such as a ROM, an optical disk, or a hard disk drive, and when the software is executed by a processing device (a processor), the processing device and peripheral devices execute the functions specified by the software. A system, an apparatus, or a device may include one or more non-transitory recording media on/in which the software is recorded, a processing device (a processor), and necessary hardware devices, for example, an interface.

First Embodiment

The description below will be given of an imaging apparatus, an imaging system, and an imaging method in a first embodiment of the present disclosure. The imaging apparatus and so on in the first embodiment are particularly effective in cases in which a subject is performing cyclical motion in an imaging range in a short time. The "subject is performing cyclical motion in an imaging range" as used herein means that a subject is performing vibration, oscillation, reciprocatory motion, rotational motion, controlled repetitive operation, or the like to cause a positional change to occur in an imaging range and to cyclically reach substantially the same position, angle, and so on. Not all subjects do not have to be performing cyclic motions, and some of the subjects may be performing cyclic motions. Also, when a plurality of subjects is performing cyclical motions, the cycles thereof may be or may not be the same. In addition, the number of motion cycles of each subject that is performing motion may be one, or the motion cycles may be a mixture of motions having a plurality of cycles.

The cyclic motion of each subject may be spontaneous or may be caused by external driving. Each subject may be vibrated, oscillated, or the like by a drive device. The external driving may be performed by an actuator or the like in an imaging system, as described below. Each subject may be a living organism that performs vibrational or oscillatory motion. Alternatively, the motion may be caused by local thermal expansion excited by irradiation with cyclic pulsed laser or the like.

One example of the spontaneous cyclic motion is vibration or oscillation of a structure, such as a bridge. A structure, such as a bridge, vibrates or oscillates due to influences of wind, traveling vehicles, and so on, and the vibration or oscillation has a specific cycle defined by a natural frequency. Since the natural frequency includes information regarding structure deterioration or the like, the cycle of the vibration or oscillation also includes information regarding the deterioration or the like.

When the subject is a drive device, examples of the subject's cyclic motion include cyclic motion of an engine, a motor, or the like and cyclic motion, such as vibration or oscillation, of a mechanical element driven thereby. In an engine that operates at a certain rotational speed, an explosion occurs with a cycle determined by the rotational speed. A major cause of the explosion is that the engine vibrates or oscillates according to the rotational speed. Ink jet apparatuses that discharge ink at regular intervals and also manufacturing apparatuses used in manufacturing processes in various fields operate with cyclic motions. Examples of the manufacturing processes include laser ablation in which pulsed laser is emitted at regular intervals and printing that is performed at a certain rotational speed.

When the subject is a living organism, examples of the subject's cyclic motion include cyclic motion, such as vibration or oscillation, of a bacteria flagellar motor, an insect wing, and so on. Alternatively, even when an alternating-current magnetic field is applied to a subject to which magnetic beads are attached, the subject also performs cyclical motion.

<Overview of Imaging Apparatus>

FIG. 1 is a block diagram illustrating the imaging apparatus in the first embodiment of the present disclosure. An imaging apparatus 101 includes an imaging device 12 and a control circuit 14. The imaging apparatus 101 may further include an imaging optical system 11 and a memory 15.

The imaging optical system 11 converges light from a subject to form an image in a light-receiving plane of the imaging device 12 described below. The imaging optical system 11 can be implemented by a known optical system that is used for an ordinary imaging apparatus and that is constituted by one or more lenses including an objective lens and so on. The imaging optical system 11 may be configured using a reflective optical system including a concave mirror or the like, instead of the lens(es).

The imaging device 12 photoelectrically converts a subject image, formed in the light-receiving plane where pixels are arrayed two-dimensionally, into electrical signals and outputs image data with a sampling cycle Tf, which is a frame cycle.

Figure 15:
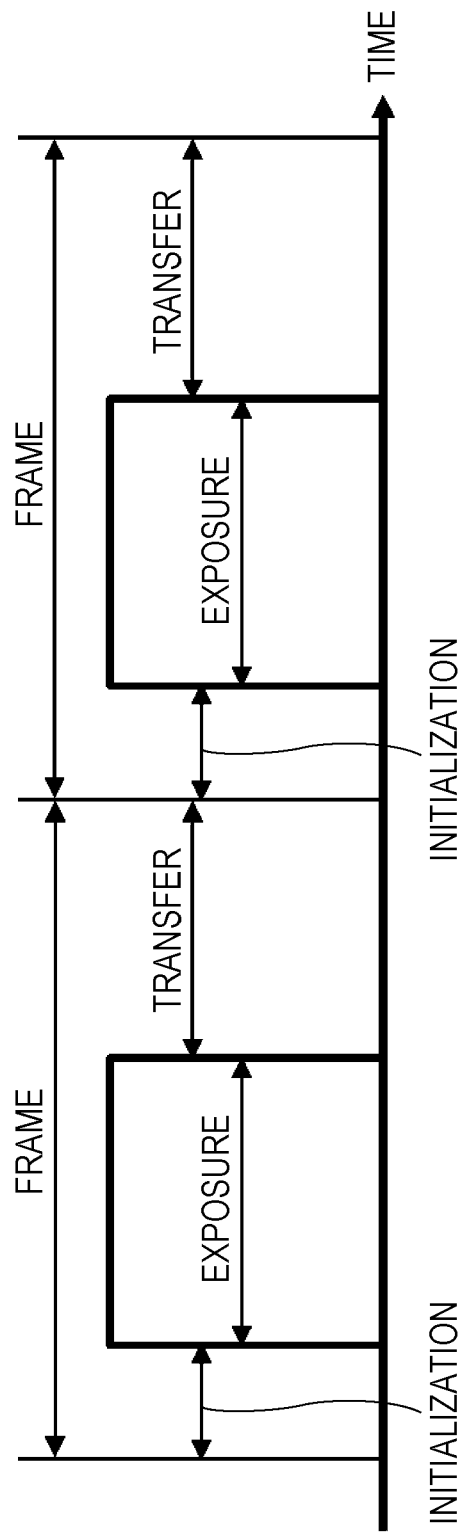
FIG. 15 is a diagram illustrating the structure of frames in the imaging apparatus in the first embodiment of the present disclosure.

The sampling cycle Tf means that the interval between the start time of one frame and the start time of a next frame is 1/Tf. As illustrated in FIG. 15, each frame may be constituted by a plurality of steps, for example, initialization, exposure, and transfer. The exposure time may be shorter than the interval between the start time of one frame and the start time of a next frame.

The imaging device 12 has variable sensitivity. The sensitivity of the imaging device 12 can be changed during each exposure period. In the present embodiment, the sensitivity may be changed, for example, between two values. That is, the sensitivity of the imaging device 12 may be able to be switched between a high sensitivity state and a low sensitivity state and does not necessarily have to be able to be set to an intermediate sensitivity thereof. In the low sensitivity state, the imaging device 12 may have virtually no sensitivity. The sensitivity of the imaging device 12 may be able to be switched to any of more than or equal to two values between high sensitivity and low sensitivity and, for example, may be able to be changed between high sensitivity and low sensitivity in a stepwise or continuous manner. In the imaging device 12, when the sensitivity can be changed to any of more than or equal to two values, one value may be selected from a plurality of values for each of the high sensitivity and the low sensitivity.

The sensitivity change of the imaging device 12 may be performed at high speed or may be performed by an electronic sensitivity changing function. Also, sensitivities of the pixels may be changed at once. The imaging device 12 may acquire images by performing shutter operation according to a global shutter system.

Examples of an imaging device whose sensitivity can be changed during each exposure period include a charge-coupled device (CCD) image sensor with a charge dumping mechanism and an image sensor with an image intensifier. Also, an imaging apparatus using a laminate-type image sensor may be used.

Figure 2:
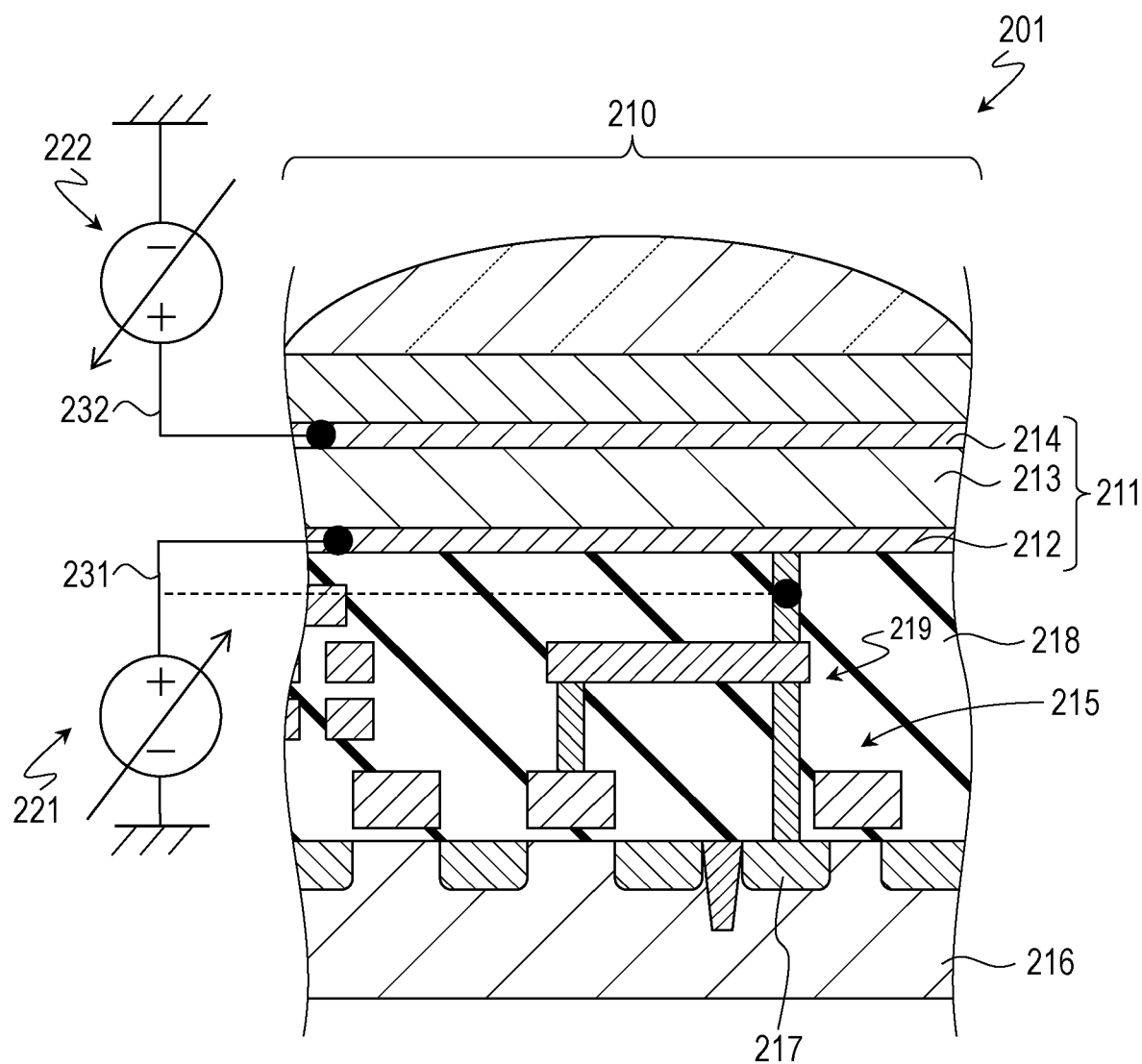
FIG. 2 is a schematic sectional view illustrating one example of the structure of imaging cells in an imaging device.

One example of a laminate-type image sensor will be described with reference to FIG. 2. FIG. 2 illustrates an overview of an exemplary configuration of an imaging device 201. The imaging device 201 includes a plurality of imaging cells 210, which is a plurality of pixels. In FIG. 2, one of the imaging cells 210 is illustrated as a representative thereof.

Each of the imaging cells 210 in the imaging device 201 has a semiconductor substrate 216 and an interlayer insulating layer 218. A charge accumulation area 217 is formed in the semiconductor substrate 216, and the interlayer insulating layer 218 covers the semiconductor substrate 216. Each imaging cell 210 further has a photoelectric converter 211 supported by the semiconductor substrate 216 and the interlayer insulating layer 218. The photoelectric converter 211 includes a pixel electrode 212, a photoelectric conversion film 213, and a counter electrode 214. The photoelectric conversion film 213 is sandwiched between the pixel electrode 212 and the counter electrode 214. The counter electrode 214 may have a characteristic of transmitting light having a wavelength to be detected and may be constituted by, for example, electrically conductive transparent material, such as indium tin oxide (ITO). The photoelectric conversion film 213 is, for example, an organic semiconductor film.

The imaging device 201 further includes a first voltage supply circuit 221 and a second voltage supply circuit 222. The first voltage supply circuit 221 and the second voltage supply circuit 222 are connected to the pixel electrode 212 and the counter electrode 214 through a first signal line 231 and a second signal line 232, respectively. Although, in the present embodiment, the imaging device 201 includes the first voltage supply circuit 221 and the second voltage supply circuit 222, the imaging device 201 may include one of the first voltage supply circuit 221 and the second voltage supply circuit 222, and the other may be connected to a reference voltage. The first voltage supply circuit 221 and the second voltage supply circuit 222 supply predetermined voltages to the pixel electrode 212 and the counter electrode 214, respectively, at timings based on external commands. The photoelectric conversion film 213 is given a potential difference corresponding to the voltages that the first voltage supply circuit 221 and the second voltage supply circuit 222 respectively apply to the pixel electrode 212 and the counter electrode 214.

The first voltage supply circuit 221 breaks its electrical connection with the charge accumulation area 217 at a timing based on an external command. After the electrical connection is broken, the potential of the charge accumulation area 217 changes depending on the amount of charge generated in the photoelectric conversion film 213.

In the photoelectric converter 211, light that is transmitted through the counter electrode 214 and is incident on the photoelectric conversion film 213 causes holes and electrons to be generated through photoelectric conversion. When a potential difference is given between the pixel electrode 212 and the counter electrode 214, the holes and the electrons move according to an electric field formed between the pixel electrode 212 and the counter electrode 214. In a high sensitivity state in which the potential difference is large to some degree, either the holes or the electrons are gathered by the pixel electrode 212, and the other holes or electrons are gathered by the counter electrode 214 in accordance with the orientation of the generated electric field, and signal charge due to the holes or electrons gathered by the pixel electrode 212 is accumulated in the charge accumulation area 217 via a connection portion 219. On the other hand, when the potential difference given between the pixel electrode 212 and the counter electrode 214 is small, the generated holes and electrons recombine before moving to the pixel electrode 212 and the counter electrode 214. That is, a low sensitivity state is realized in which even when light is received, the light cannot be detected as charge.

The control circuit 14 controls the imaging device 12 so as to change the sensitivity thereof with a cycle Ts1, which is a sensitivity modulation cycle shorter than the exposure period of the imaging device 12. Specifically, the control circuit 14 controls the first voltage supply circuit 221 and the second voltage supply circuit 222 so as to switch between the high sensitivity state in which the potential difference applied between the pixel electrode 212 and the counter electrode 214 is large and the low sensitivity state in which the potential difference applied between the pixel electrode 212 and the counter electrode 214 is small.

Figure 16:
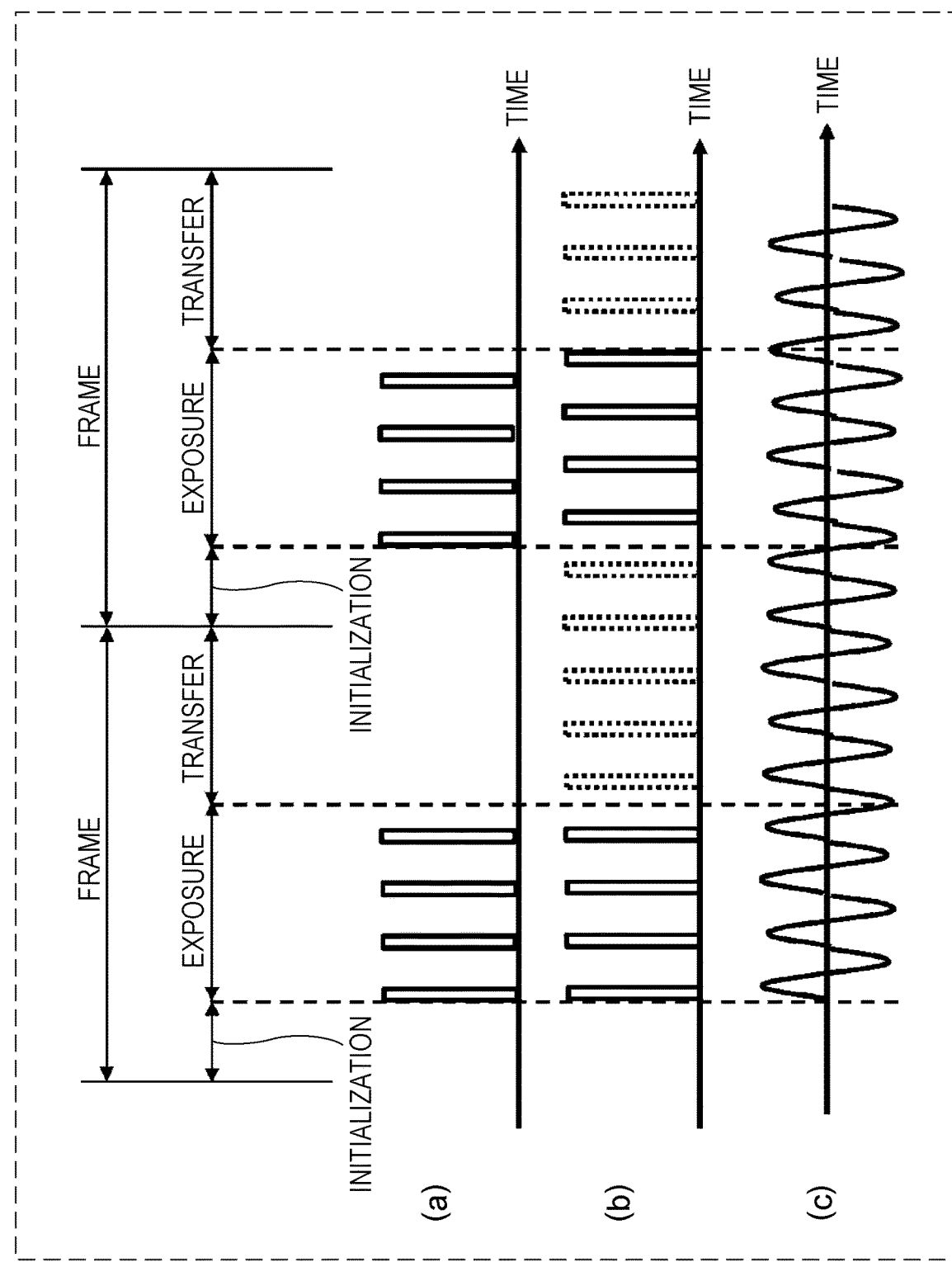
FIG. 16 is a schematic diagram illustrating a timing example of sensitivity modulation of the imaging device in the imaging apparatus in the first embodiment.
Figure 17:
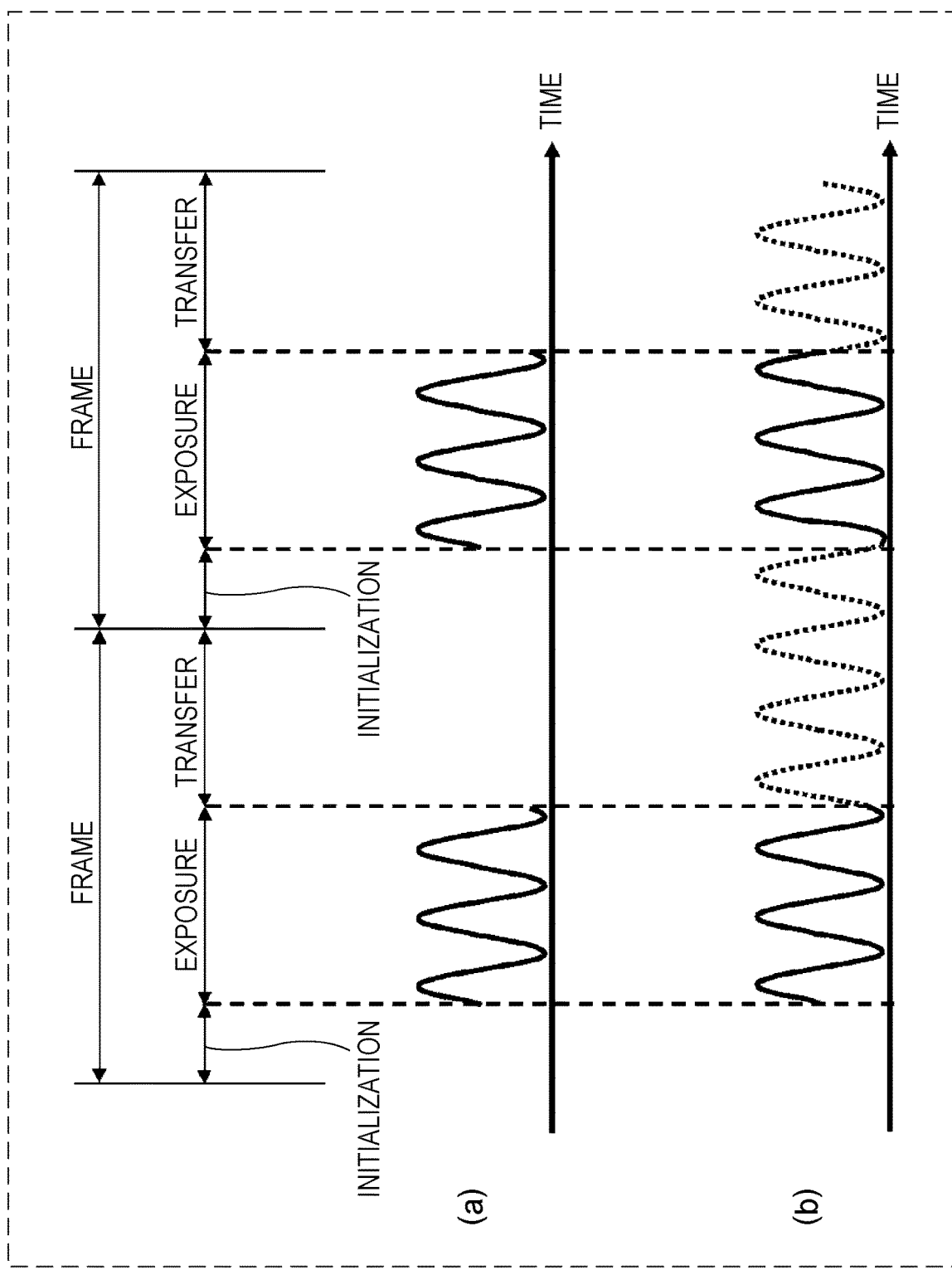
FIG. 17 is a schematic diagram illustrating a timing example of the sensitivity modulation of the imaging device in the imaging apparatus in the first embodiment.

The control circuit 14 may control a phase of the sensitivity change of the imaging device 12, as illustrated in FIGS. 16 and 17. In FIG. 16, part (a) illustrates a first example of the sensitivity change of the imaging device 12, part (b) illustrates a second example of the sensitivity change of the imaging device 12, and part (c) illustrates changes of the position of a subject. In parts (a) and (b) in FIG. 16, the vertical axis represents sensitivity, and the horizontal axis represents time. In part (c) in FIG. 16, the vertical axis represents a position coordinate, and the horizontal axis represents time. For example, control may be performed so that the same phase is always reached at the start of each exposure period, as illustrated in part (a) in FIG. 16. Alternatively, the phase may be changed depending on the start time of each exposure period, as illustrated in part (b) in FIG. 16.

For example, it is assumed that a subject is performing cyclical motion, and the position coordinate of the subject changes cyclically, as illustrated in part (c) in FIG. 16.

In this case, consider a case in which the sensitivity change of the imaging device 12 has the same cycle. In the case of the first example in which the phase of the sensitivity change of the imaging device 12 is always the same at the start of each exposure period, a relative relationship between the phase of the cyclic motion of the subject and the phase of the sensitivity change of the imaging device 12 varies from one frame to another, unless the cycle of the frames is an integer multiple of the cycle of the cyclic motion of the subject.

On the other hand, when the cycle of the sensitivity change of the imaging device 12 is changed depending on the start time of each exposure period, the phase of the cyclic motion of the subject and the phase of the sensitivity change of the imaging device 12 can always be maintained to have a constant relationship, as in the second example described above.

When the cycle of the cyclic motion of the subject and the cycle of the sensitivity change of the imaging device 12 do not match each other, there are also cases in which changing the phase of the sensitivity change of the imaging device 12 depending on the start time of the exposure makes it easy to perform analysis or makes an imaging result look natural to the human eye.

The above-described advantages are not limited to cases in which the sensitivity change takes two values, that is, high sensitivity and low sensitivity, as illustrated in FIG. 16. Substantially the same advantages can also be obtained when the sensitivity of the imaging device 12 changes continuously, as illustrated in parts (a) and (b) in FIG. 17. In FIG. 17, part (a) illustrates a third example of the sensitivity change of the imaging device 12, and part (b) illustrates a fourth example of the sensitivity change of the imaging device 12. In parts (a) and (b) FIG. 17, the vertical axis represents sensitivity, and the horizontal axis represents time.

In more than or equal to one high sensitivity state during each exposure period, signal charge is accumulated in the charge accumulation areas 217, and the accumulated signal charge is read from all the pixels in the imaging device 12 with the sampling cycle Tf.

The memory 15 stores therein image data output from the imaging device 12. The image data includes a plurality of images output with the sampling cycle Tf. As described below in detail, when a subject includes a first component that changes with a cycle Tt1 shorter than the exposure time, the image data of the captured images includes information on the first component of the subject which changes with a cycle Tv1 longer than the sampling cycle Tf. That is, although the first component changes with the cycle Tt1 shorter than the exposure time, the first component is recorded as changes having the cycle Tv1 longer than the sampling cycle Tf. In the present embodiment, changes of the first component are displacements of a subject, as described above.

Figure 3:
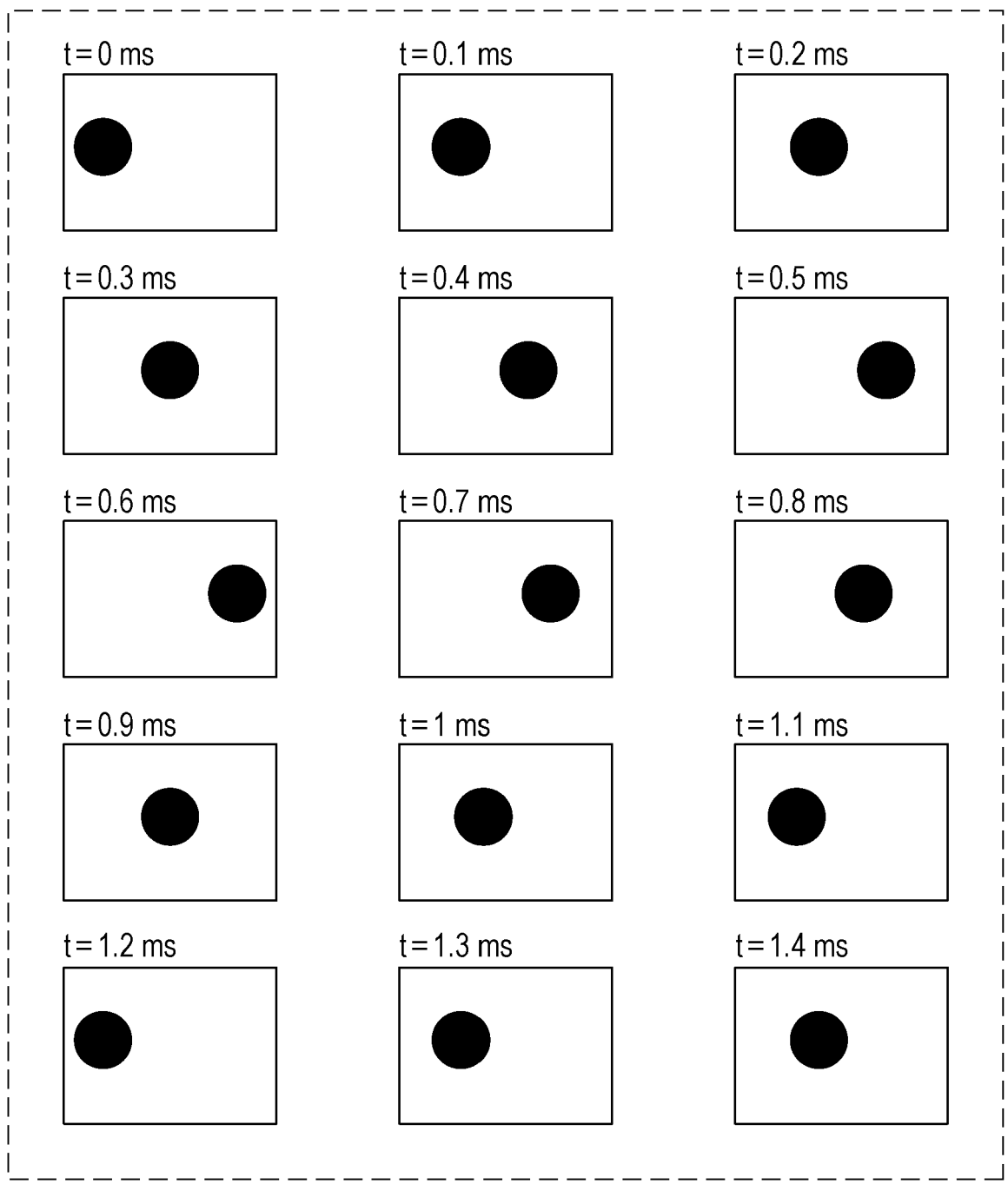
FIG. 3 is a schematic diagram illustrating motion of a subject.

The present embodiment will be described below in conjunction with a specific example. FIG. 3 illustrates one example of a subject that is performing cyclical motion in an imaging range. In this example, a subject that is present at a left end at time 0 ms moves to the right side, reaches a right end at time 0.6 ms, and reverses the direction of the movement, and then, at time 1.2 ms, the subject returns to the position where the subject was present at time 0 ms. After time 1.2 ms, the subject repeats the same motion. That is, this subject is performing cyclic motion with a cycle of 1.2 ms.

Figure 4:
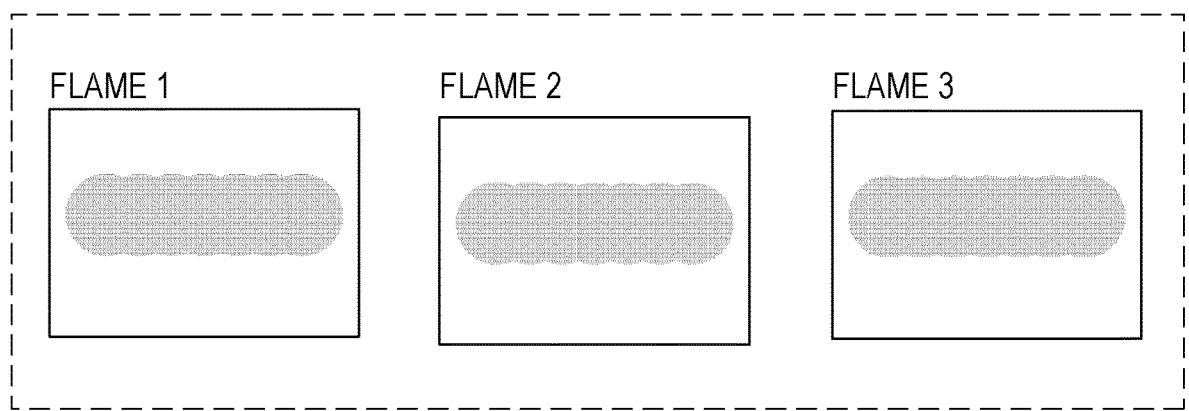
FIG. 4 is a schematic diagram illustrating an image example when the subject is imaged with an ordinary imaging apparatus.

For example, when ordinary imaging is performed on this subject for an exposure time of 30 ms and with 30 frames per second (30 fps, the sampling cycle Tf=33.3 ms), the cyclic motion of the subject is averaged, since the exposure time is longer than ten times the motion cycle of the subject. As a result, substantially the same images showing the trace of the movement of the subject are acquired in all frames, as illustrated in FIG. 4. That is, images captured in the ordinary imaging do not show information on the subject's motion from one frame to another.

Figure 5:
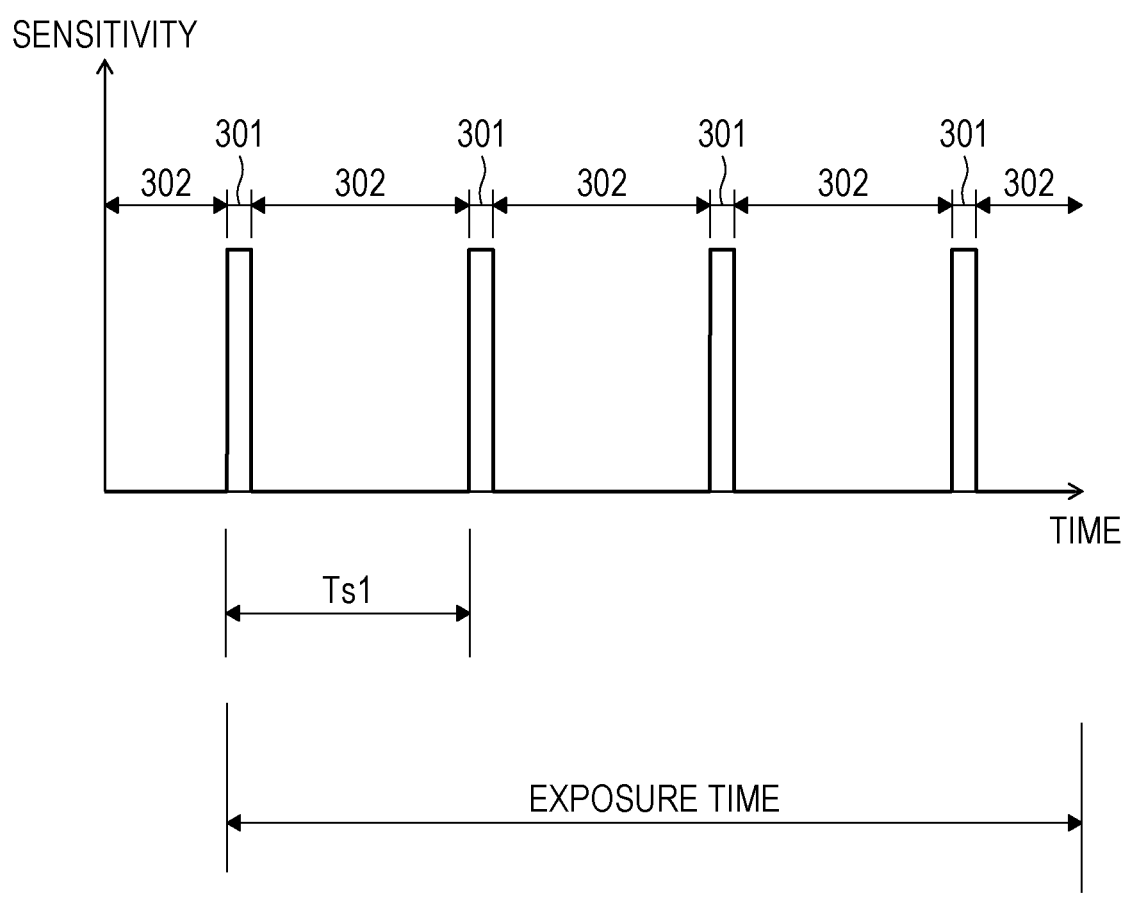
FIG. 5 is a schematic diagram illustrating a timing example of sensitivity modulation of an imaging device in the imaging apparatus in the first embodiment.

In contrast, in the present embodiment, imaging is performed on a subject while cyclically changing the sensitivity during each exposure period. FIG. 5 illustrates one example of the sensitivity. The sensitivity is constituted by high sensitivity sections 301 and low sensitivity sections 302, which are other than the high sensitivity sections 301. The positions, that is, the phases, of the high sensitivity sections 301 in the cycles are assumed to be the same. In the low sensitivity sections 302, the sensitivity may be as low as possible and is lower than or equal to one tenth of the sensitivity in the high sensitivity sections 301. In the low sensitivity sections 302, the imaging device 12 may have virtually no sensitivity. Appropriate values of the cycle of the sensitivity and the phase of the sensitivity can be selected according to the motion cycle of the subject and the purpose of the imaging.

For example, in the example illustrated in FIG. 5, the cycle Ts1 of the sensitivity modulation is 1.205 ms. Also, the length of each high sensitivity section 301 is 10 μs. That is, the ratio (time) of the high sensitivity section 301 in one cycle is lower than or equal to 1/100. In this example, the sensitivity of each low sensitivity section 302 is virtually zero. The smaller the ratio of the high sensitivity section 301 is, the smaller the motion blur in the imaging is, as described below. On the other hand, when the ratio of the high sensitivity section 301 is small, a substantial exposure time decreases even for the same exposure time, thus requiring higher sensitivity and a larger amount of light. The ratio of the high sensitivity section 301 can be determined according to the moving speed of a subject, the cycle of cyclic motion of a subject, a purpose of imaging, an imaging environment, including brightness, and so on.

A description will be given of images acquired when a subject is imaged with the above-described sensitivity modulation cycle, for an exposure time of 30 ms, and with 30 frames per second (30 fps, the sampling cycle Tf=33.3 ms). The number of cycles Tt1 of a subject's cyclic motion included in one exposure time is 25. Also, the number of sensitivity cycles Ts1 included in one exposure time is 24.9.

When the number of cycles Tt1 of a subject's cyclic motion included in one exposure time and the number of sensitivity cycles Ts1 included in the exposure time match each other, that is, when the cycles Tt1 and Ts1 are equal to each other, the subject is always imaged at the same position of displacement positions reached during one motion cycle. Thus, the position of the subject does not change during one exposure time. The position of the subject does not change from one frame to another, either. Hence, in practice, the subject is imaged as if the subject were stationary even though the subject is performing cyclic motion.

Figure 6:
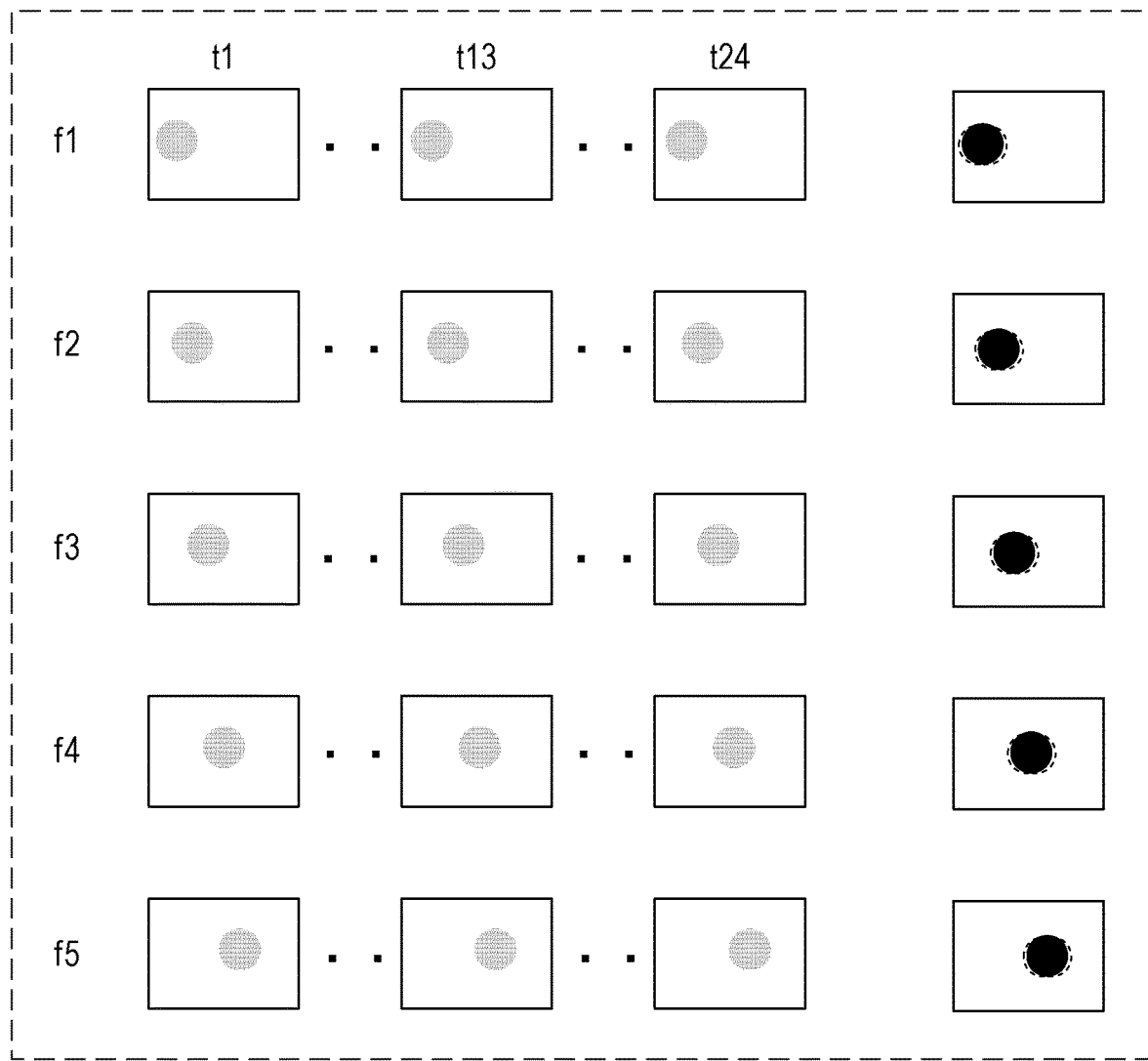
FIG. 6 is a schematic diagram illustrating timing at which a subject is exposed when the subject is imaged with the imaging apparatus in the first embodiment.

In contrast, when the number of cycles Tt1 of a subject's cyclic motion included in one exposure time and the number of sensitivity cycles Ts1 included in the exposure time are slightly different from each other, that is, the cycles Tt1 and Ts1 are slightly displaced from each other, the position of the subject imaged in one sensitivity cycle Ts1 differs from the position of the subject imaged in another sensitivity cycle Ts1. However, since the displacement between the cycles Tt1 and Ts1 is slight, the amount of the displacement is small. FIG. 6 schematically illustrates the positions of a subject in the cycles Ts1, which are sensitivity modulation cycles, included in each frame. In FIG. 6, the positions of the subject in first, 13th, 24th cycles Ts1 of the cycles Ts1 of the sensitivity modulation in each frame are illustrated in the lateral direction, and the frames are illustrated in the vertical direction. In each frame, the amount of displacement of the subject that moves from one cycle Ts1 of the sensitivity modulation to another is small, and thus, the subject is imaged at generally the same position. Thus, the subject's images that are captured in all the sensitivity modulation cycles in each frame have generally no motion blur, as illustrated at the right end. On the other hand, the position (phase) of the subject is displaced by 0.1 cycle from one frame to another. That is, in continuous frames, the subject is imaged while the position of the subject is displaced little by little. In the above-described example, this phase displacement corresponds to one cycle with 10 frames. That is, the subject's cyclic motion with a cycle of 10 frames (33.3 ms) is recorded in images in the continuous frames. That is, the subject's motion originally having a cycle of 1.2 ms is converted into moving images that display a change for every 33.3 ms. In other words, it is possible to acquire an imaging result that is similar to that of 1/27.8× slow-motion imaging. The amplitude (the amount of displacement) of the subject's cyclic motion, the direction of the motion, and so on can be analyzed from the captured frame images.

That is, when the cycle of the subject's motion in the captured frame images is represented by Tv1, expression (1) below holds between the cycle Tt1 of the subject's motion and the cycle Ts1 of the sensitivity modulation.

$$Tv1=Tt1 \cdot Ts1/|Tt1-Ts1| \tag{1}$$

That is, Tv1 represents a difference frequency component between the cycle Ts1 of the sensitivity modulation and the cycle Tt1 of the subject's cyclic motion.

The cycle Ts1 of the sensitivity modulation can be determined by an operator, and the cycle Tv1 of the subject's motion in the images can be obtained from the image data. Accordingly, these values can be used to calculate the cycle Tt1 of the subject's motion. The cycle Tv1 of the motion may be determined by an operator visually checking the images or may be determined by means, such as computer-based image recognition. For example, the cycle Tv1 of the motion may be determined by selecting a reference frame, searching for a frame having the highest similarly to the reference frame, and using a time difference between the reference frame and a frame found by the searching. Alternatively, the cycle Tv1 of the motion may be determined by performing a Fourier transform on pixel values of pixels in the image data.

Since the image data includes a plurality of frame images acquired with the sampling cycle Tf, it can be said that the cyclic motion of the subject is digitized with the sampling cycle Tf. Thus, a subject's motion in images can be analyzed according to a sampling theorem, when the cycle Tv1 of the subject's motion in the images and the sampling cycle Tf satisfy the relationship given by 2Tf<Tv1. That is, the sampling cycle Tf may satisfy:

$$2Tf<Tt1 \cdot Ts1/|Tt1-Ts1| \tag{2}$$

As can be understood from expressions (1) and (2), the cycle Tv1 of the subject's motion in the images becomes small when the difference between the cycle Tt1 of the subject's motion and the cycle Ts1 of the sensitivity modulation increases. When the cycle Tv1 becomes smaller than 2Tf, it is difficult to analyze the cyclic motion of the subject. Accordingly, the difference between the cycle Tt1 of the subject's motion and the cycle Ts1 of the sensitivity modulation may be small. However, Tv1 increases, as the difference between the cycle Tt1 of the subject's motion and the cycle Ts1 of the sensitivity modulation decreases. More than or equal to one cycle of the subject's motion in captured frame images may be recorded in order to accurately analyze the subject. Thus, the number of frames or the cycle Ts1 of the sensitivity modulation may be adjusted so as to satisfy:

$$Tf \times Nf > Tv1 \tag{3}$$

where Nf represents the number of frames that are recorded, and Tf represents the cycle of frames.

However, since implementation of the technology in the present disclosure does not necessarily require that more than or equal to one cycle of a subject's motion in captured frame images be recorded, the technology in the present disclosure can also be implemented with a form that does not satisfy expression (3) noted above.

When a plurality of subjects presents in images that are captured, and the subjects are performing motions with respective different cycles, information on the motions of the respective subjects can be obtained according to expression (1) noted above. For example, consider a case in which one subject includes a first component and another subject includes a second component, and the subjects are performing motions with the respective cycles Tt1 and Tt2. When the difference between the cycles Tt1 and Tt2 is small, the cyclic motion of the first component and the cyclic motion of the second component can be imaged with one round of imaging, that is, with the same cycle Ts1 of the sensitivity modulation. In this case, the relationship given by expression (2) noted above may be satisfied.

That is, $$2Tf<Tt1 \cdot Ts1/|Tt1-Ts1|$$

$$2Tf<Tt2 \cdot Ts1/|Tt2-Ts1|$$

may be satisfied.

In this case, when the motion cycle of the first component and the motion cycle of the second component in captured images are represented by Tv1 and Tv2, respectively, the relationships given by $$Tv1 = Tt1 \cdot Ts1 / |Tt1 - Ts1|$$

$$Tv2 = Tt2 \cdot Ts1 / |Tt2 - Ts1|$$

hold. Accordingly, the motion cycles Tt1 and Tt2 of the first component and the second component of the actual subjects can be calculated by calculating the cycles Tv1 and Tv2 of the first component and the second component from data of a plurality of frame images captured with the cycle Ts1 of the sensitivity modulation.

When the difference between the cycles Tt1 and Tt2 is large, cycles Ts1 and Ts2, which are different sensitivity modulation cycles, may be set for the cycles Tt1 and Tt2 to perform imaging including a plurality of frame images in each of the cycles Ts1 and Ts2 of the sensitivity modulation.

In this case, $$2Tf < Tt1 \cdot Ts1 / |Tt1 - Ts1|$$

$$2Tf < Tt2 \cdot Ts2 / |Tt2 - Ts2|$$

may be satisfied.

When the motion cycles of the first component and the second component in the captured images are represented by Tv1 and Tv2, respectively, the relationships given by $$Tv1 = Tt1 \cdot Ts1 / |Tt1 - Ts1|$$

$$Tv2 = Tt2 \cdot Ts2 / |Tt2 - Ts2|$$

hold. Accordingly, the motion cycles Tt1 and Tt2 of the first component and the second component of the actual subjects can be calculated by calculating the cycle Tv1 of the first component from data of frame images captured with the cycle Ts1 of the sensitivity modulation and calculating the cycle Tv2 of the second component from data of a plurality of frame images captured with the cycle Ts2 of the sensitivity modulation.

Thus, according to the imaging apparatus in the present disclosure, information on a subject's changes that occur in a short time can be obtained even when the imaging device does not have a special structure, such as a structure of a high-speed imaging device. Images acquired by the imaging apparatus in the present embodiment are seemingly similar to slow motion images acquired by a high-speed camera or the like. However, there are differences as described below.

(1) One cycle of a subject's motion in ordinary slow-motion imaging corresponds to one cycle of the subject's motion in actual time. When one motion cycle of a subject that performs cyclical motion with a cycle of 1.2 ms is imaged with 10 frames, the exposure time of one frame cannot exceed 0.12 ms. Thus, in ordinary slow-motion imaging, it is necessary to use higher intensity illumination or a higher sensitivity image sensor than that in normal-speed imaging. However, there are cases in which it is difficult to perform high intensity illumination depending on a subject, for example, when the high intensity illumination deteriorates the subject. Also, even when a high-sensitivity image sensor is used, a light shot noise problem occurs, thus causing limitations in achieving favorable imaging.

On the other hand, in the imaging apparatus in the present disclosure, one cycle of a subject's motion in the image data is longer than one cycle of the subject's motion in actual time. Images corresponding to a plurality of cycles of a subject's cyclic motion can be captured in one frame time, as described above, and thus the exposure time is not limited. Thus, it is possible to image the subject with an ordinary illumination intensity, so that it is not necessary to use a special high-sensitivity imaging device.

(2) Both the ordinary slow-motion imaging and the imaging performed by the imaging apparatus in the present disclosure require transferring the image data for each frame. However, in the ordinary slow-motion imaging, the time interval of frames needs to be reduced as the cycle of a subject's cyclic motion becomes short. Since the amount of data that can be transferred in a short time interval of frames is limited, for example, the number of pixels in an imaging device in each ordinary high-speed camera is reduced in order to reduce the amount of data. On the other hand, in the imaging apparatus in the present disclosure, the sampling cycle can be determined independently of a subject's motion cycle. For example, the sampling cycle may be 30 fps, as in ordinary imaging apparatuses. Thus, a sufficient time can be taken for the data transfer, so that no limitation occurs in the number of pixels in the imaging device.

(3) One cycle in an imaging result in the ordinary slow-motion imaging corresponds to one cycle of a subject's cyclic motion. Thus, when motion of one subject is imaged for one cycle, information on the motion in the cycle can be obtained, but information on motion in another cycle is not included in image data of captured images. In contrast, in the imaging apparatus in the present disclosure, images for a plurality of cycles of a subject's motion in actual time are integrated in one cycle of the subject's motion in acquired image data. Thus, when the cycle of a subject's cyclic motion is completely constant, the data of an image captured in each frame includes data in which phases in a particular range of the subject's cyclic motion are integrated. On the other hand, when the cycle of a subject's motion fluctuates, data of an image captured in one frame includes data in which phases in a wider range than the range of the phases when the cycle of the subject's cyclic motion is completely constant are integrated. This is recorded in image data as motion blur in images of the subject. That is, when the cycle of a subject's motion fluctuates, the image data includes blurry images of the subject, compared with the case in which the cycle is constant. This blur gets worse, as the fluctuation range of the cycle increases. Accordingly, information on the fluctuation range of the cycle can be obtained from the blur in the image data.

(4) One cycle in image data in ordinary slow-motion imaging includes a subject's cyclic motion corresponding to one cycle thereof in actual time. Thus, an event that occurs suddenly during an imaging period is imaged as it is. For example, when opaque smoke, a spark, or the like occurs incidentally in its cycle, this event is imaged as it is, to thereby impede imaging of a subject that is present behind the event. For example, in a particular frame, such smoke or the like may hide a subject. In contrast, in the imaging apparatus in the present disclosure, images for a plurality of cycles of a subject's motion in actual time are integrated in one cycle of the subject's motion in acquired image data. Thus, an event that occurs suddenly in a certain cycle is averaged, so that influences thereof decrease. For example, opaque smoke or a spark that occurs in one sensitivity modulation cycle in one frame period impedes imaging of a subject that is present behind the event in the cycle. However, in another sensitivity modulation cycle in the same frame period, when neither smoke nor a spark occurs or when the position where smoke or a spark occurs is different, frame images that are integrated include images of the subject correctly. According to the present disclosure, since a subject is imaged through the integration over a plurality of sensitivity modulation cycles, an object or the like that appears randomly or changes its position randomly during imaging is averaged as noise, and thus influences of such an object can be suppressed or reduced.

<Imaging System>

Figure 7:
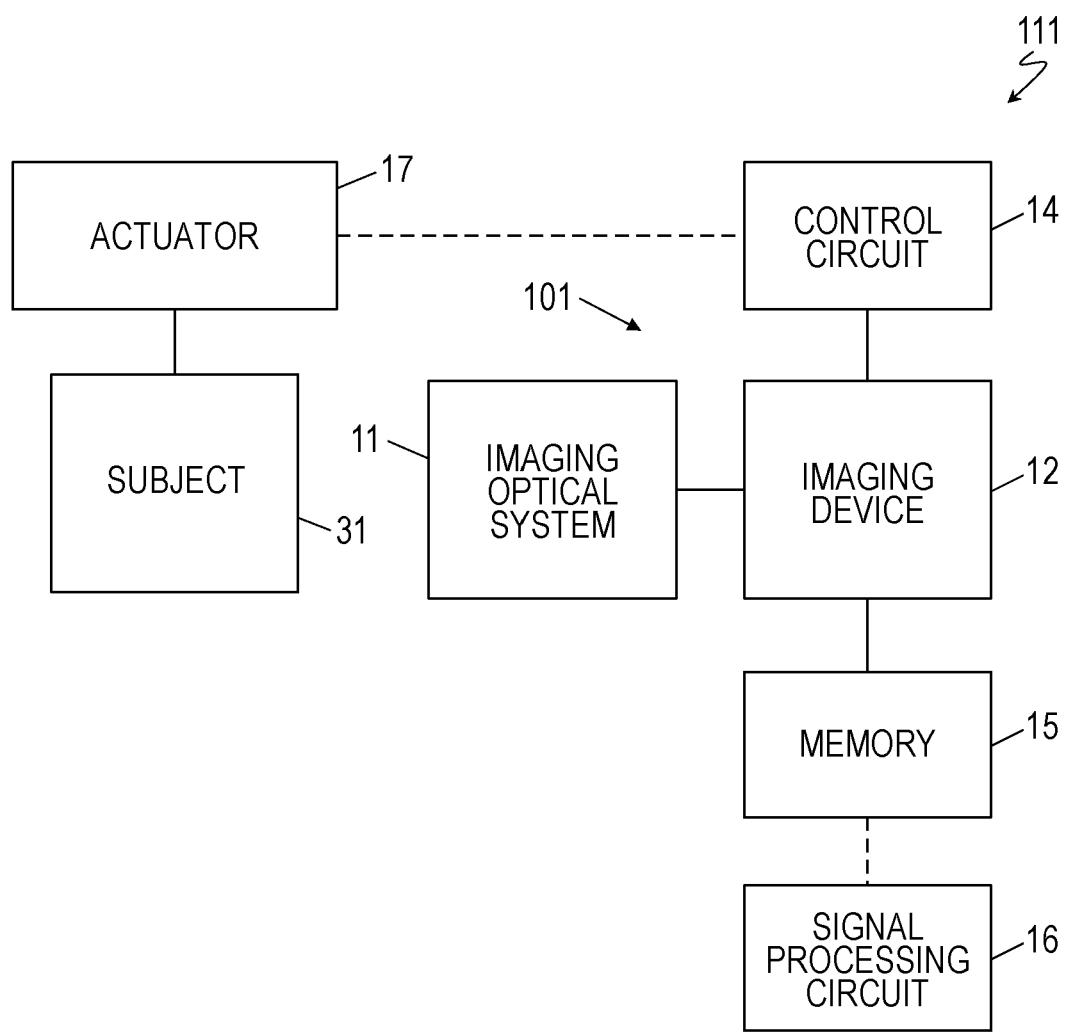
FIG. 7 is a block diagram illustrating a configuration example of an imaging system in the first embodiment of the present disclosure.

A description will be given of an imaging system in the embodiment of the present disclosure. FIG. 7 is a block diagram illustrating a configuration example of an imaging system 111 in the present embodiment. The imaging system 111 includes the imaging apparatus 101, a signal processing circuit 16, and an actuator 17. The signal processing circuit 16 and the actuator 17 are optional and may be eliminated from the imaging system 111, depending on the application.

The signal processing circuit 16 reads the image data recorded in the memory 15 and performs, for example, image recognition to search for a frame having the highest similarity to a reference frame. In addition, the cycle Tv1 of a subject's motion in a plurality of frame images is calculated based on a time difference between the reference frame and a frame found by the searching.

The actuator 17 cyclically applies stress to a subject 31. The actuator 17 is effectively used in cases in which the subject 31 is not spontaneously performing cyclic motion. For example, stress is externally applied to a subject 31 that is not spontaneously performing cyclical motion, to thereby cause the subject 31 to perform cyclic motion, such as vibration or oscillation, that reflects the shape and the internal structure of the subject 31, an elasticity characteristic of the inside of the subject 31, and so on. The control circuit 14 controls the cycle of the cyclic stress generated by the actuator 17. The control circuit 14 controls the constituent elements of the imaging system 111.

The imaging system 111 can be operated in various cases. Operations of the imaging system 111 in case (1) in which an approximate motion cycle of a subject that performs cyclical motion is known in advance, in case (2) in which motion cycle of a subject is not known, and in case (3) in which motion of a subject is analyzed will be described below by way of example.

Figure 8:
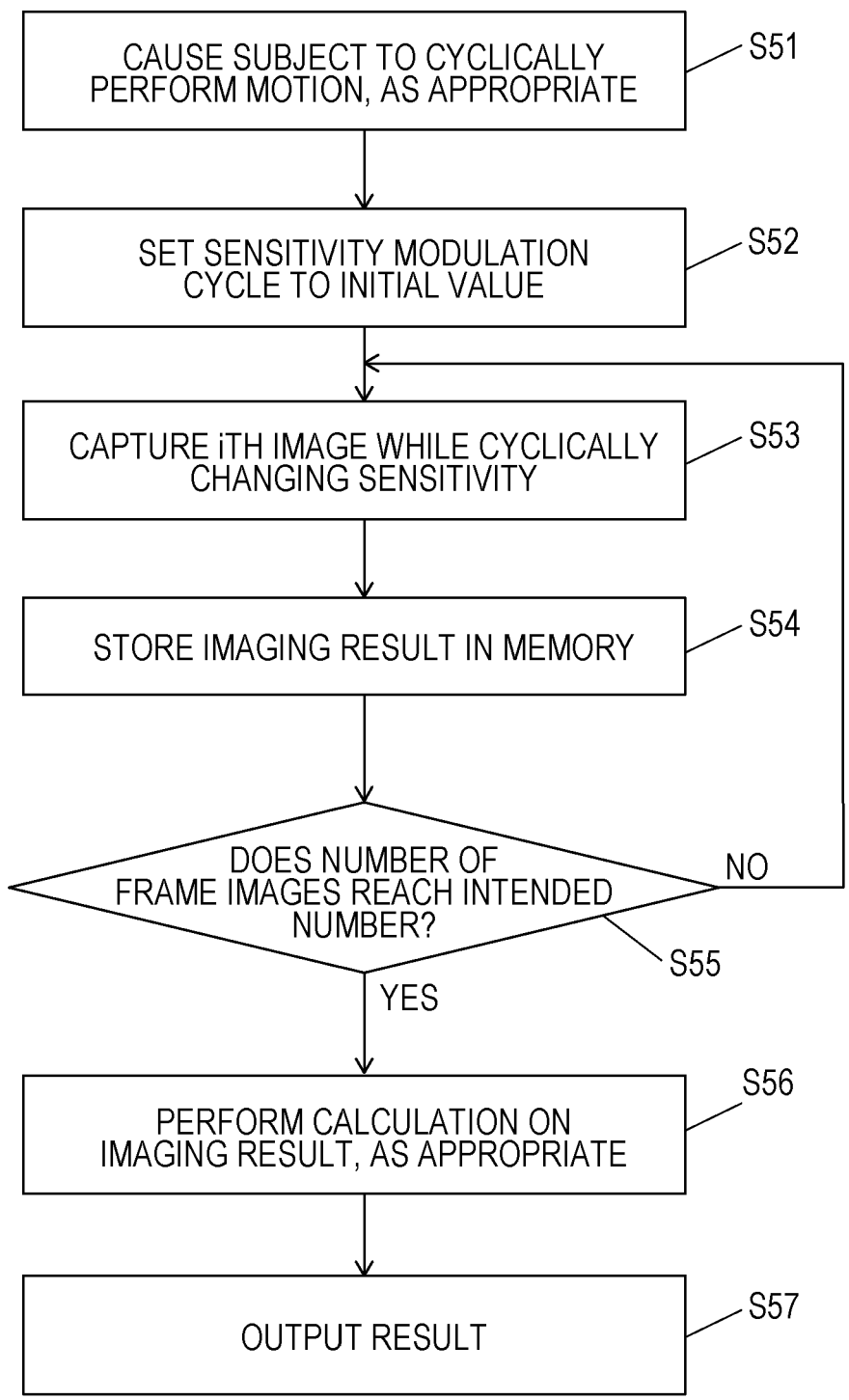
FIG. 8 is a flowchart illustrating an operation example of the imaging system in the first embodiment.

Case (1) in which an Approximate Motion Cycle of a Subject that Performs Cyclical Motion is Known in Advance FIG. 8 is a flowchart illustrating an operation of the imaging system 111 when a subject whose motion cycle is known in advance is imaged. In the imaging apparatus 101 in the imaging system 111, an initial value of the sensitivity modulation cycle is pre-set in a memory or the like for the control circuit 14.

When the subject 31 is not spontaneously performing cyclic motion, the actuator 17 is driven to apply cyclic stress to the subject 31 to cause the subject 31 to cyclically perform motion, as appropriate (S51).

Next, the control circuit 14 gives the initial value of the sensitivity modulation cycle to the imaging device 12 (S52) to cyclically change the sensitivity with the initial value, and the imaging device 12 captures an ith image (i=1, a first frame) of the subject 31 (S53). The captured image is recorded to the memory 15 (S54).

The control circuit 14 counts the number of captured images to determine whether or not the number of frame images reaches an intended number (S55). When the number of frame images does not reach the intended number, steps S53 to S55 are repeated. When the number of frame images reaches the intended number, the signal processing circuit 16 reads image data of the intended number of captured frame images from the memory 15 and calculates the cycle Tv1 of the subject's motion in the frame images by using the read image data, as appropriate (S56). In addition, the accurate motion cycle Tt1 of the subject 31 may be calculated based on expression (1) noted above. The signal processing circuit 16 outputs the determined cycle Tv1 of the subject's motion and/or the accurate motion cycle Tt1 of the subject 31 (S57).

Case (2) in which Motion Cycle of a Subject is not Known

Figure 9:
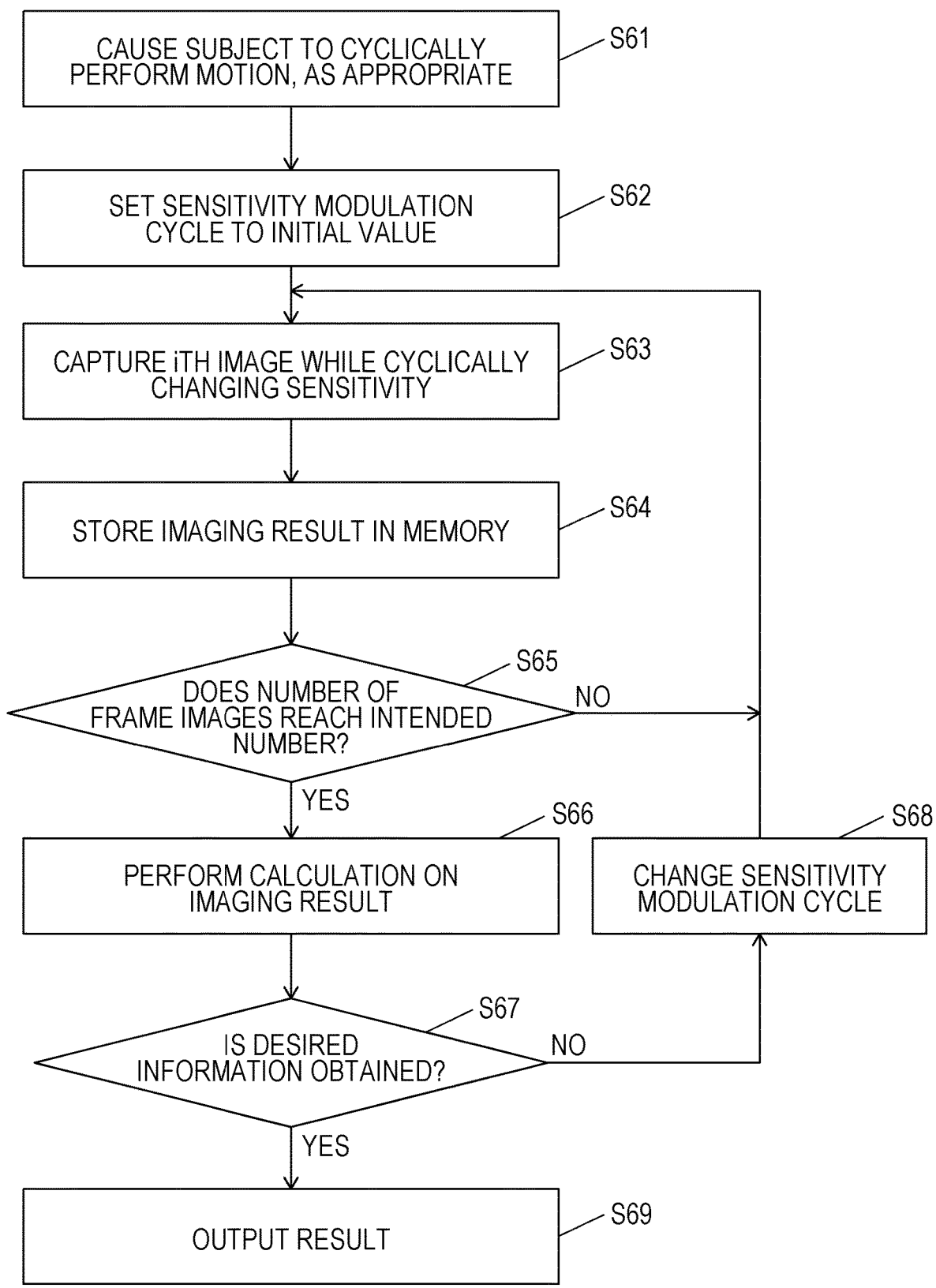
FIG. 9 is a flowchart illustrating another operation example of the imaging system in the first embodiment.

FIG. 9 is a flowchart illustrating an operation of the imaging system 111 when a subject whose motion cycle is not known is imaged. In the imaging apparatus 101 in the imaging system 111, an initial value of the sensitivity modulation cycle is pre-set in a memory or the like for the control circuit 14.

When the subject 31 is not spontaneously performing cyclical motion, the actuator 17 is driven to apply cyclic stress to the subject 31 to cause the subject 31 to cyclically perform motion, as appropriate (S61).

Next, the control circuit 14 gives the initial value of the sensitivity modulation cycle to the imaging device 12 (S62) to cyclically change the sensitivity with the initial value, and the imaging device 12 captures an ith image (i=1, a first frame) of the subject 31 (S63). The captured image is recorded to the memory 15 (S64).

The control circuit 14 counts the number of captured images to determine whether or not the number of frame images reaches an intended number (S65). When the number of frame images does not reach the intended number, steps S63 to S65 are repeated. When the number of frame images reaches the intended number, the signal processing circuit 16 reads image data of the intended number of captured frame images from the memory 15 and calculates the cycle Tv1 of the subject's motion in the frame images by using the read image data (S66).

A determination is made as to a result of the calculation of the cycle Tv1 (S67). When the cycle Tv1 cannot be determined, the sensitivity modulation cycle set for the imaging device 12 is changed, for example, using a predetermined increase/reduction value (S68), and steps S63 to S67 are repeated. The case in which the cycle Tv1 cannot be determined is a case in which periodicity of the subject's motion in the image data of the captured frame images cannot be detected. In other words, the case in which the cycle Tv1 cannot be determined is a case in which the cycle Tv1 of the subject's motion in frame images in image data is longer than an entire period in which the image data is acquired or a case in which the relationship given by 2Tf≤Tv1 is not satisfied.

When it is determined that the cycle Tv1 of the subject's motion is correctly calculated, the signal processing circuit 16 outputs the calculated cycle Tv1 of the subject's motion (S69). When the accurate motion cycle Tt1 of the subject 31 is also calculated in step S66, the cycle Tt1 is output (S69).

Case (3) in which Motion of a Subject is Analyzed

Figure 10:
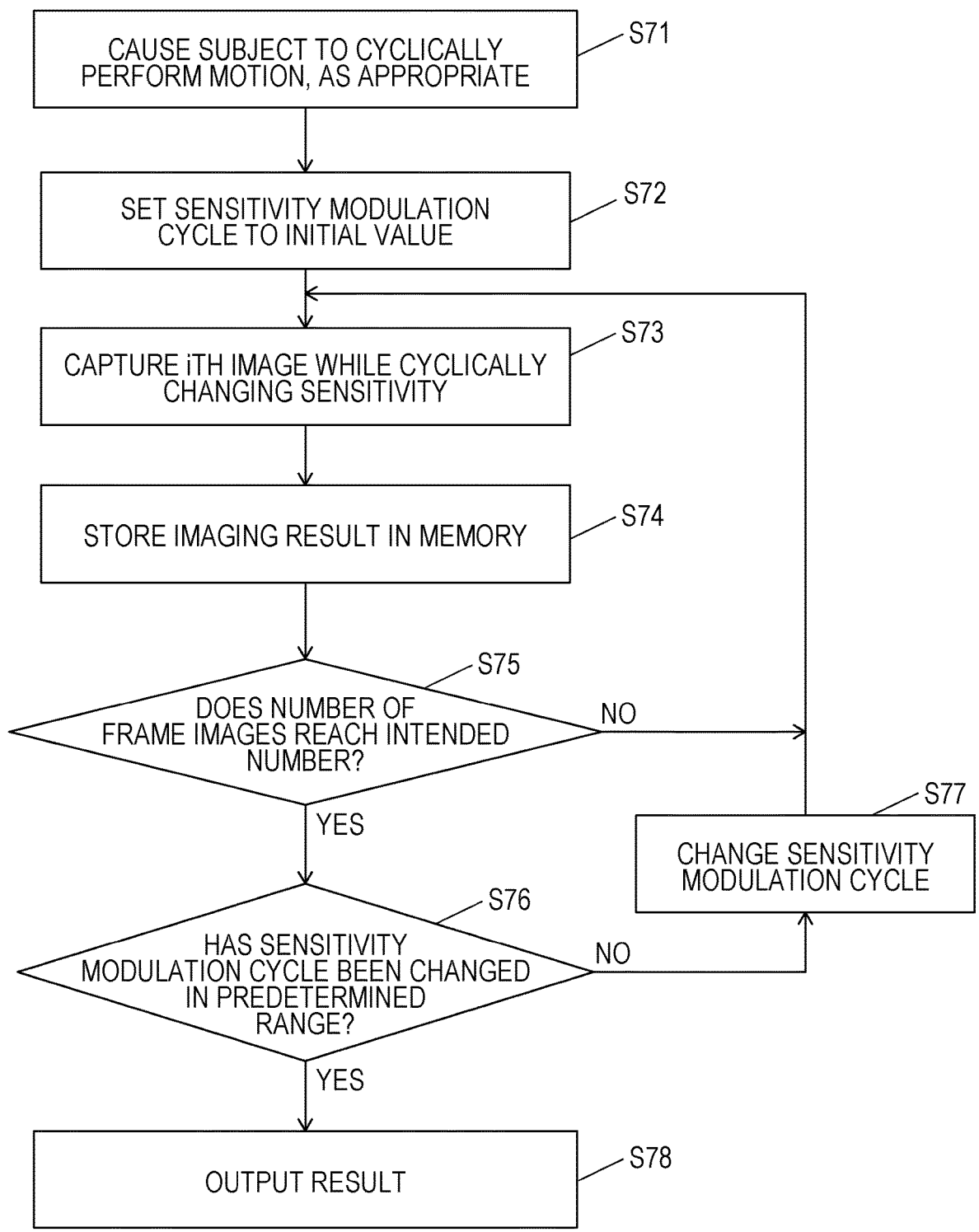
FIG. 10 is a flowchart illustrating another operation example of the imaging system in the first embodiment.

FIG. 10 is a flowchart illustrating an operation of the imaging system 111 when motion of a subject is analyzed. In the imaging apparatus 101 in the imaging system 111, an initial value of the sensitivity modulation cycle is pre-set in a memory or the like for the control circuit 14.

When the subject 31 is not spontaneously performing cyclical motion, the actuator 17 is driven to apply cyclic stress to the subject 31 to cause the subject 31 to cyclically perform motion, as appropriate (S71).

Next, the control circuit 14 gives the initial value of the sensitivity modulation cycle to the imaging device 12 (S72) to cyclically change the sensitivity with the initial value, and the imaging device 12 captures an ith image (i=1, a first frame) of the subject 31 (S73). The captured image is recorded to the memory 15 (S74).

The control circuit 14 counts the number of captured images to determine whether or not the number of frame images reaches an intended number (S75). When the number of frame images does not reach the intended number, steps S73 to S75 are repeated.

When the number of frame images reaches the intended number, the control circuit 14 determines whether or not the sensitivity modulation cycle used in the imaging has been changed in a predetermined range (S76). When the sensitivity modulation cycle used in the imaging has not been changed in the predetermined range, the sensitivity modulation cycle set for the imaging device 12 is changed, for example, using a predetermined increase/reduction value (S77), and steps S73 to S76 are repeated. When the sensitivity modulation cycle has been changed in the predetermined range (S76), a result is output (S78), and the imaging ends.

Second Embodiment

<Imaging System>

A description will be given of an imaging apparatus, an imaging system, and an imaging method in a second embodiment of the present disclosure. The imaging apparatus, the imaging system, and the imaging method in the present embodiment are particularly effective in cases in which a subject is not performing motion, and the brightness of each position of the subject changes cyclically. The brightness of the subject may be changed due to cyclical change of the intensity of natural light emitted by the subject, due to cyclical change of the intensity of reflected light from the subject as a result of cyclical change of the intensity of external irradiation light, or due to cyclical change of the intensity of photoluminescent light as a result of excitation of a part or an entirety of the subject.

Figure 11:
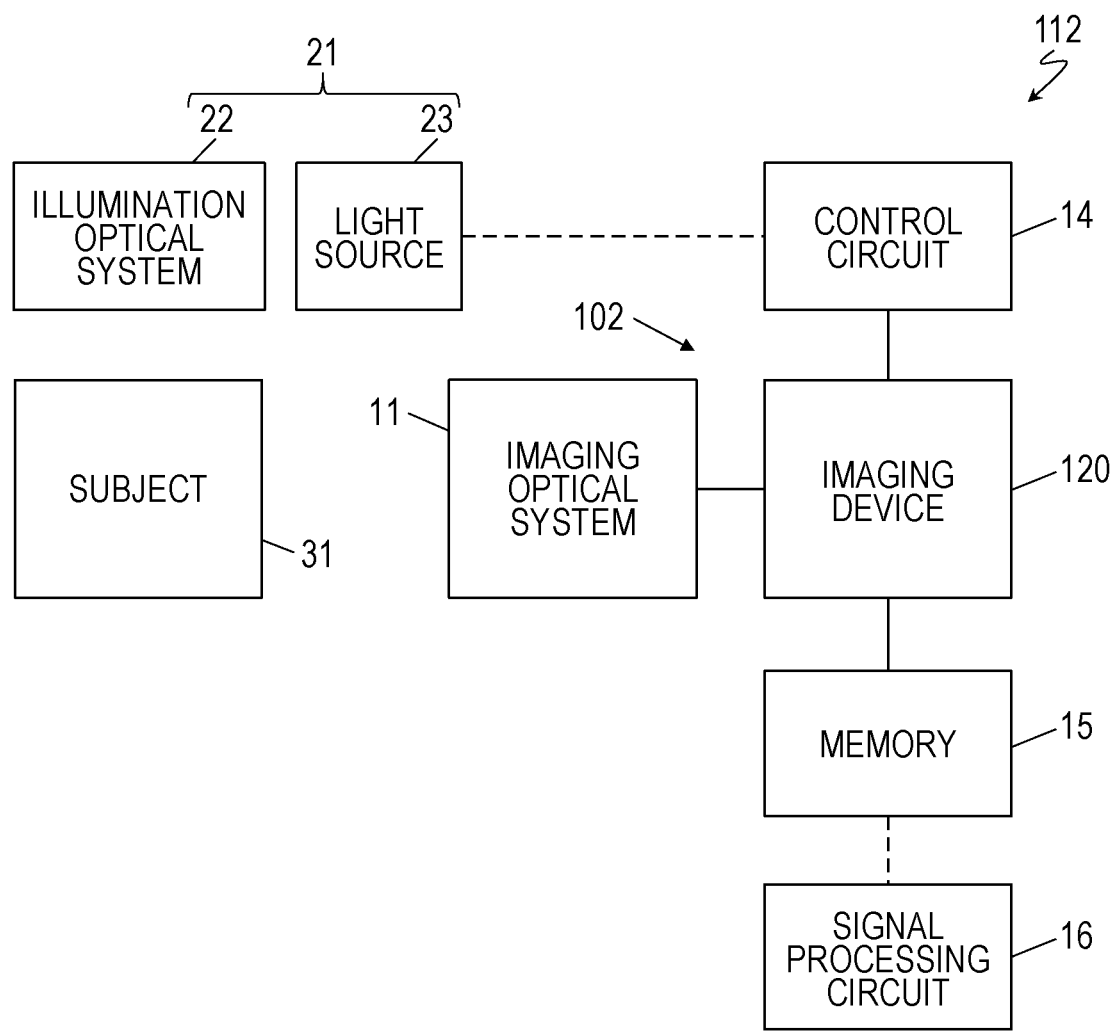
FIG. 11 is a block diagram illustrating a configuration example of an imaging system in a second embodiment of the present disclosure.

First, a description will be given of an example in which the intensity of external irradiation light changes cyclically. FIG. 11 is a block diagram of an imaging system 112 in the present embodiment. The imaging system 112 includes an imaging apparatus 102, the signal processing circuit 16, and an illumination apparatus 21. The imaging apparatus 102 includes the imaging optical system 11, an imaging device 120, the control circuit 14, and the memory 15. The sensitivity of the imaging device 120 can be changed between high sensitivity and low sensitivity in a stepwise or continuous manner. Other constituent elements of the imaging apparatus 102 have structures and functions that are substantially the same as those of the constituent elements of the imaging apparatus 101 in the first embodiment.

The illumination apparatus 21 includes an illumination optical system 22 and a light source 23. The illumination optical system 22 changes the state of light that is incident from the light source 23 to irradiate the subject 31 with the light. The illumination optical system 22 may include a deflection filter or the like. The light source 23 outputs at least two light rays having different wavelengths. That is, the light source 23 outputs a light ray having a first wavelength and at least one light ray having a wavelength different from the first wavelength. The light ray having the first wavelength has an intensity that changes with a first cycle Tt1. The at least one light ray is, for example, a light ray having a second wavelength and has an intensity that changes with a second cycle Tt2. The first cycle Tt1 and the second cycle Tt2 differ from each other. The at least one light ray may further include a light ray having a third wavelength and a third cycle. The intensities of light rays other than the light ray having the first wavelength and the light ray having the second wavelength may change with time or may be constant. The light rays having the wavelengths which are emitted by the light source 23 may have intensity-changing cycles that are different for the respective wavelengths.

Figure 12:
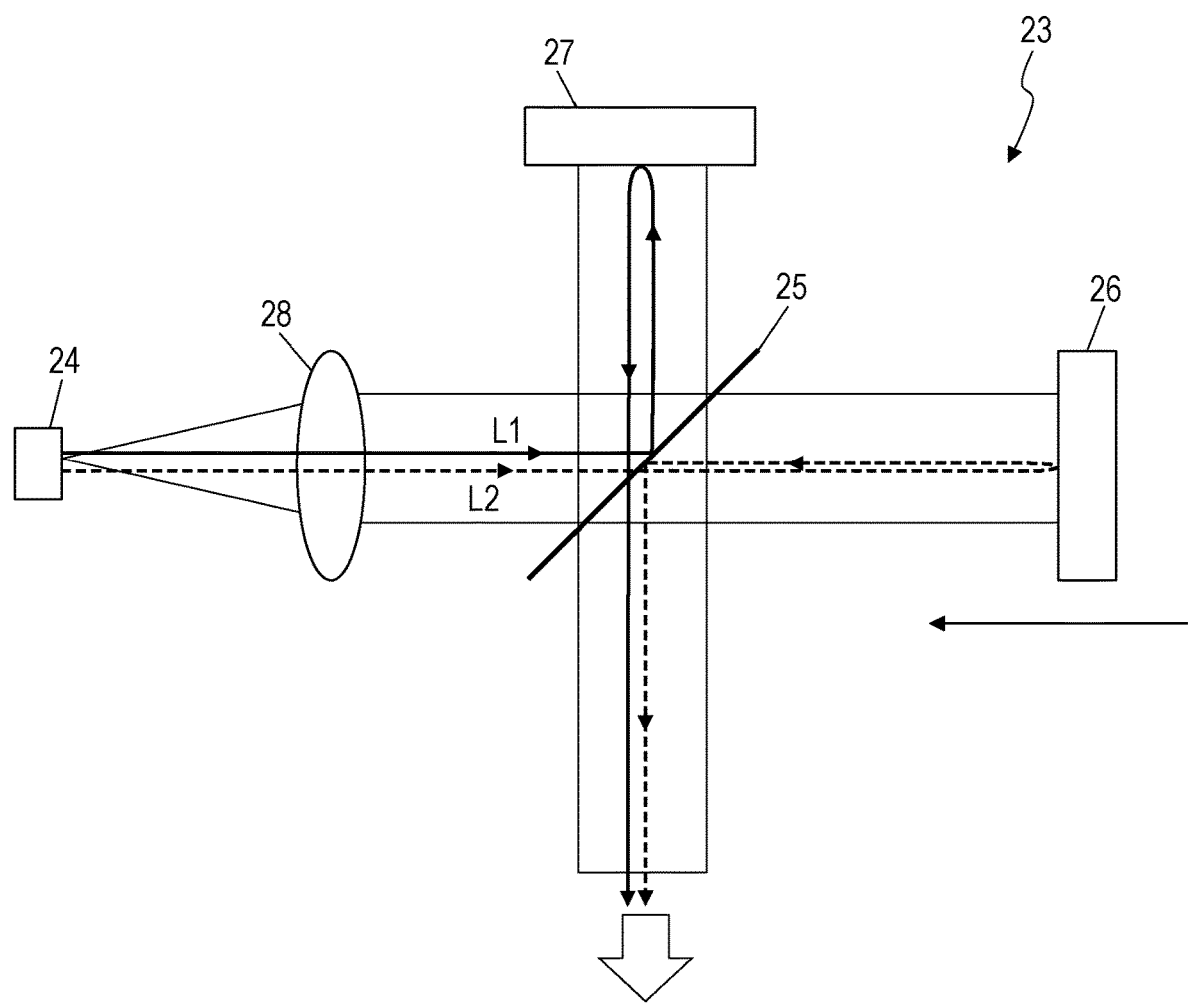
FIG. 12 is a block diagram illustrating a configuration example of a light source used in the imaging system in the second embodiment.

Such a light source 23 can be configured, for example, using an interferometer. FIG. 12 illustrates one example of the light source 23. The light source 23 is a Michelson interferometer and includes a light-emitting unit 24, a half mirror 25, a moving mirror 26, a fixed mirror 27, and a movement control apparatus (not illustrated) for the fixed mirror 27. In addition, the light source 23 may include, for example, an optical system 28 that converts a light beam, emitted from the light-emitting unit 24, into collimated light.

The light emitted from the light-emitting unit 24 may be coherent. Partial light L1 emitted from the light-emitting unit 24 is reflected by the half mirror 25 and is incident on the fixed mirror 27. Light reflected by the fixed mirror 27 passes through the half mirror 25, travels straight, and is emitted from the light source 23. Other partial light L2 emitted from the light-emitting unit 24 passes through the half mirror 25 and is incident on the moving mirror 26. The incident light is reflected by the moving mirror 26, is incident on the half mirror 25 again, is reflected by the half mirror 25, and merges with the light L1, and the resulting light is emitted from the light source 23.

A path difference between the light L1 and the light L2 is given by:

$$|Ls-Lm|$$

where Ls represents the distance from the half mirror 25 to the fixed mirror 27, and Lm represents the distance from the half mirror 25 to the moving mirror 26.

When a path difference (an optical path difference) considering the refractive index of a medium in which the light source 23 is arranged reaches an integer multiple of a wavelength, the light L1 and the light L2 strengthen each other to strengthen the light output from the light source 23, and when the path difference reaches a half-integer multiple, the light L1 and the light L2 weaken each other to weaken the light output from the light source 23.

Thus, when the moving mirror 26 is arranged at a certain position, whether the light emitted from the light-emitting unit 24 is output after strengthening each other or is output after weakening each other is dependent on the wavelength of the light emitted from the light-emitting unit 24. Accordingly, for example, when the moving mirror 26 is moving at a predetermined speed, the cycle of intensity modulation of the light emitted from the light source 23 differs. For example, when the moving mirror 26 is moved at a speed of 1 mm/s, the intensity of light having a wavelength of X nm changes with a cycle of about X/2 µs. Specifically, light having a wavelength of 686 nm, light having a wavelength of 687 nm, and light having a wavelength of 688 nm change with a cycle of about 343 µs, a cycle of about 343.5 µs, a cycle of about 344 µs, respectively. In this case, the modulation cycle of the intensity of the light having each wavelength is proportional to the wavelength, and also changes in the intensity are given by a sine function.

Accordingly, when the light-emitting unit 24 is configured so as to emit coherent light rays having different wavelengths, the light source 23 can emit light rays whose intensities change with different cycles for the respective wavelengths. A light source that includes a Michelson interferometer incorporating such a movable mirror and that has intensity-changing cycles different for the respective wavelengths is widely used in Fourier transform infrared spectrometers. Thus, a detailed description thereof is not given herein. The light source 23 can similarly be configured using not only a Michelson interferometer but also another interferometer, such as a Fabry-Perot interferometer.

It is assumed that light rays having different wavelengths are emitted from the light source 23, and the cycle of light having a wavelength λ is T(λ) (corresponding to Tt1 in the first embodiment). In this case, an intensity I(λ, t) of the light having the wavelength λ at time t is given by:

$$I(\lambda,t)=I_0(\lambda)(1+\sin(\omega(\lambda)t+\phi(\lambda))) \quad (11)$$

where $I_0(\lambda)$ represents an amplitude, and $\phi(\lambda)$ represents an initial phase.

In this case, $\omega(\lambda)$ and the cycle $T(\lambda)$ have the relationship given by:

$$\omega(\lambda) = 2\pi \frac{1}{T(\lambda)} \quad (12)$$

The light generated by the light source 23 is radiated onto the subject 31 via the illumination optical system 22. Before the subject 31 is irradiated with the light, an optical filter may be used to limit the wavelength range of the light to, for example, a wavelength range in which imaging is to be performed.

The imaging device 120 images the subject 31, irradiated with the light by the illumination apparatus 21, over a plurality of frames while changing the sensitivity with time.

For example, consider a case in which sensitivity A(t) of the imaging device 120 changes with time in accordance with:

$$A(t)=\tfrac{1}{2}A0\times(1+\sin(\omega_s t+\phi_s)) \quad (13)$$

where A0 represents an amplitude, $\phi_s$ represents an initial phase.

In this case, $\omega_s$ and the sensitivity change cycle Ts (Ts1) have the relationship given by:

$$\omega_s = 2\pi \frac{1}{T_s} \quad (14)$$

The subject 31 has a reflectance or transmittance that differs from one wavelength to another. Thus, for receiving illumination of light according to expression (11), brightness B(i, t) of an image that the subject 31 creates in an ith pixel is given by:

$$B(i,t)=R(i,\lambda)\times I(\lambda,t) \quad (15)$$

where, R(i, λ) is a term that appears due to wavelength dependency of the subject's reflectance or transmittance in the ith pixel.

In this case, signal charge qs(i, t) that occurs in the ith pixel is given by:

$$qs(i,t)=C\times B(i,t)\times A(t) \quad (16)$$

where C is a constant determined by the type of imaging device 120, the drive state thereof, and so on.

An amount of charge Q(i) accumulated in a charge accumulation portion during exposure in a period from time t=0 to T is given by:

$$Q(i)=\int_0^T qs(i)dt \quad (17)$$

Deformation of expression (17) by substituting expressions (11) to (16) thereinto yields:

$$Q(i)=\tfrac{1}{2}CR(\lambda)A0\int_0^T[1$$
$$+\sin(\omega(\lambda)t+\phi(\lambda))$$
$$+\sin(\omega_s t+\phi_s)$$
$$-\tfrac{1}{2}\cos((\omega)(\lambda)+\omega_s)t+\phi(\lambda)+\phi_s)$$
$$+\tfrac{1}{2}\cos((\omega)(\lambda)+\omega_s)t+\phi(\lambda)+\phi_s)] \quad (18)$$

In this case, the first term of expression (18) is a component that is not dependent on a frame (time). The second term, the third term, and the fourth term are terms that change with the cycle T(λ) of the brightness of the subject, with the sensitivity cycle Ts, and with a cycle shorter than the cycles T(λ) and Ts, respectively. When the exposure time T is more than or equal to ten times longer than T(λ) and Ts, the second term, the third term, and the fourth term are components that are averaged via the exposure and that are not much dependent on the frame.

Meanwhile, the fifth term is a term that varies at a frequency of ωh(λ)/2π and with a cycle of Th(λ) (corresponding to Tf1 in the first embodiment) in accordance with:

$$\omega_h(\lambda)=\omega(\lambda)-\omega_s \quad (19)$$

$$Th(\lambda)=T(\lambda T_s/|T(\lambda)-T_s| \quad (20)$$

When the difference between T(λ) and Ts is small, Th(λ) can be made to have a value larger than the exposure time, as is apparent from expression (20). The fifth term can be determined according to the Nyquist sampling theorem, when $$\frac{1}{Tf} > \frac{2}{Th} \quad (21)$$

is satisfied, where Tf represents a frame imaging interval.

R(i, λ) can be determined by performing a Fourier transform on data of images captured in a plurality of frames. Even when the light emitted by the illumination apparatus 21 includes light rays having different wavelengths and different cycles, R(i, for the respective wavelengths can be separated in a range in which expression (21) is satisfied.

Since R(i, λ) has a value determined for each pixel, as described above, R(i, includes, for example, information on molecules and atoms of a substance that constitutes a subject shown in an acquired image, the composition of the molecules and atoms, a structure, such as a film thickness, and so on of individual parts (e.g., pixels in an image) of the subject. Thus, by performing imaging, the imaging system 112 can acquire an image indicating a substance that constitutes a subject, a distribution of the amount (e.g., a film thickness) of the substance, and so on. The imaging apparatus in the present embodiment can be utilized in various applications, for example, inspection of industrial products, measurement of a distribution of a specified chemical substance, and detection of lesions in medical application.

Consider a case in which the light source 23 in the illumination apparatus 21 in the above-described example emits light having a wavelength of 686 nm and an intensity modulation cycle of about 343 μs, light having a wavelength of 687 nm and an intensity modulation cycle of about 343.5 μs, and light having a wavelength of 688 nm and an intensity modulation cycle of about 344 μs, and the imaging device 120 changes in sensitivity with a cycle of 344.8 μs and performs imaging at 60 fps.

In this case, the brightness of an image changes every cycle of about 66.7 ms for the light having the wavelength of 686 nm, every cycle of about 90.9 ms for the light having the wavelength of 687 nm, and every cycle of about 142.9 ms for the light having the wavelength of 688 nm. When the sampling cycle of moving images is 60 fps, the brightness thereof changes about every four frames for the light having the wavelength of 686 nm, about every 5.4 frames for the light having the wavelength of 687 nm, and about every 8.6 frames for the light having the wavelength of 688 nm. Accordingly, R(i, λ) for the wavelength of 686 nm, R(i, λ) for the wavelength of 687 nm, and R(i, λ) for the wavelength of 688 nm in each pixel can be respectively determined by performing a Fourier transform on an imaging result and separating R(i, λ) for each brightness-changing cycle. That is, a distribution of R(i, λ) for the wavelengths of 686 nm, 687 nm, and 688 nm can be obtained for the subject 31. In this example, since a difference between the intensity modulation cycles of the light having the three wavelengths is small, appropriate image data can be acquired with one round of imaging. However, when the difference between the intensity modulation cycles of the light having the three wavelengths is large, appropriate image data can be acquired by performing two or three rounds of imaging through changing the sensitivity modulation cycle of the imaging device 120, as described above in the first embodiment.

For example, oxygen molecules exhibit relatively high absorption to a wavelength of 687 nm and is weak in absorbing wavelengths of 686 nm and 688 nm. Thus, comparing the intensity distribution of R(i, λ) for the wavelength of 687 nm in the subject 31 with the intensity distribution of R(i, λ) for the wavelength of 686 nm or 688 nm makes it possible to estimate the distribution and the density of oxygen molecules.

Different molecules exhibit specific absorption to light having different wavelengths. Thus, the density distribution of different molecules can be estimated by changing the wavelength of the light emitted from the light source 23 in the illumination apparatus 21, the moving speed of the moving mirror 26, the sensitivity modulation cycle of the imaging device 120, and so on.

According to the present embodiment, light rays having mutually different intensity modulation cycles and mutually different wavelengths are used as illumination light to image a subject to thereby make it possible to obtain information on a subject's changes that occur in a short time, that is, make it possible to acquire an image without losing information of the light-emission intensity cycle for each wavelength of the illumination light through the exposure, and to make it possible to perform multi-spectrum analysis on the subject.

The imaging system 112 can be operated in various cases. Operations of the imaging system 112 in case (1) in which the sensitivity modulation cycle of the imaging device 120 is not changed and case (2) in which the sensitivity modulation cycle of the imaging device 120 is changed will be described below by way of example.

Figure 13:
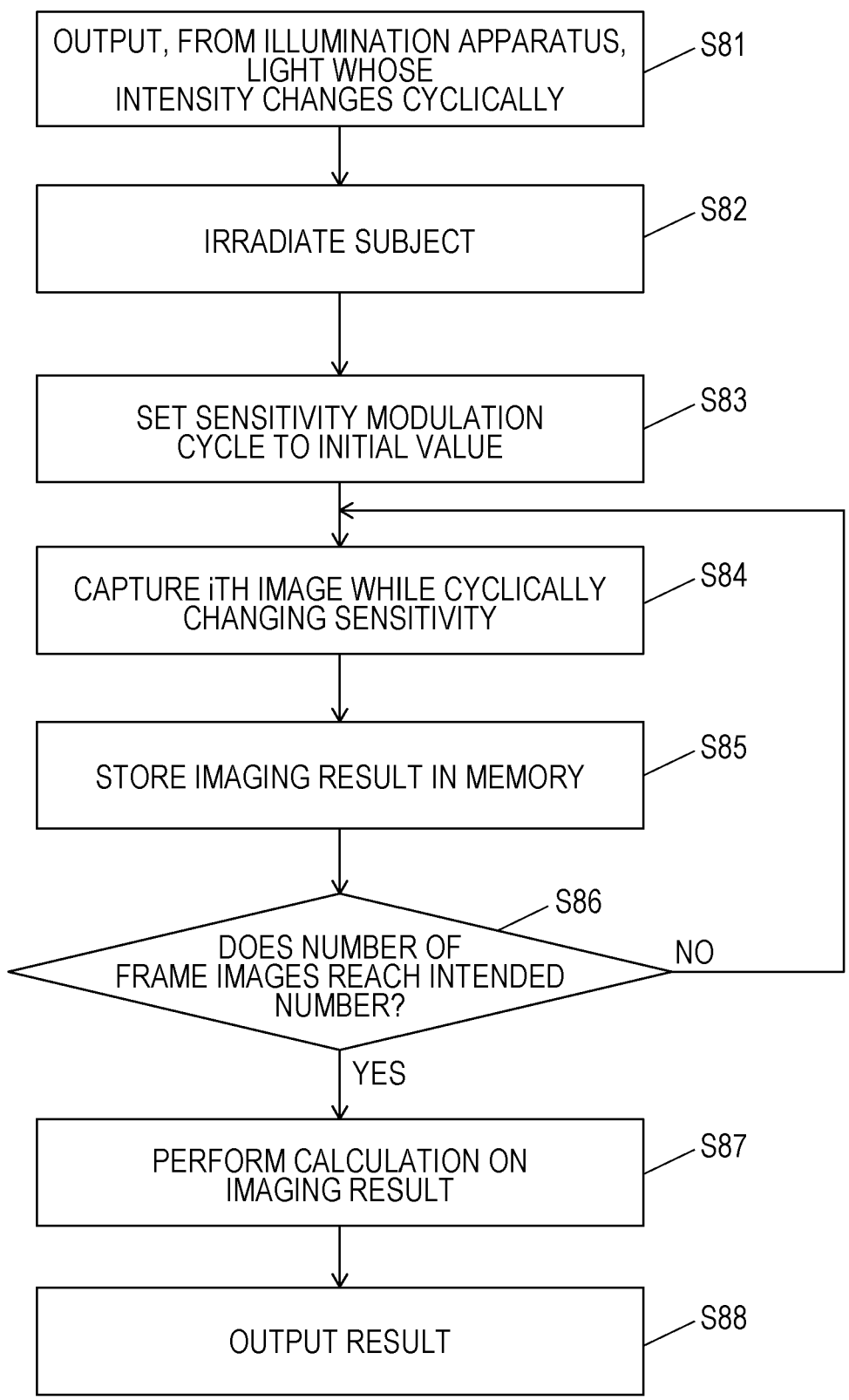
FIG. 13 is a flowchart illustrating an operation example of the imaging system in the second embodiment.

Case (1) in which the Sensitivity Modulation Cycle of the Imaging Device is not Changed FIG. 13 is a flowchart illustrating an operation of the imaging system 112 when a subject is imaged without changing the sensitivity modulation cycle of the imaging device 120. This operation is used, for example, when only a light ray having one wavelength is analyzed or when a difference between the intensity modulation cycles of a plurality of light rays is small as in the example described above. In the imaging apparatus 102 in the imaging system 112, an initial value of the sensitivity modulation cycle is pre-set in a memory or the like for the control circuit 14.

First, light whose intensity changes cyclically is emitted from the illumination apparatus 21 (S81) to be radiated onto the subject 31 (S82). Next, the control circuit 14 gives the initial value of the sensitivity modulation cycle to the imaging device 120 (S83) to cyclically change the sensitivity with the initial value, and the imaging device 120 captures an ith image (i=1, a first frame) of the subject 31 (S84). The captured image is recorded to the memory 15 (S85).

The control circuit 14 counts the number of captured images to determine whether or not the number of frame images reaches an intended number (S86). When the number of frame images does not reach the intended number, steps S84 to S86 are repeated. When the number of frame images reaches the intended number, the signal processing circuit 16 reads image data of the intended number of captured frame images from the memory 15 and calculates the cycle Tv1 of the subject's motion in the frame images by using the read image data (S87). The signal processing circuit 16 outputs a result of the calculation (S88).

Figure 14:
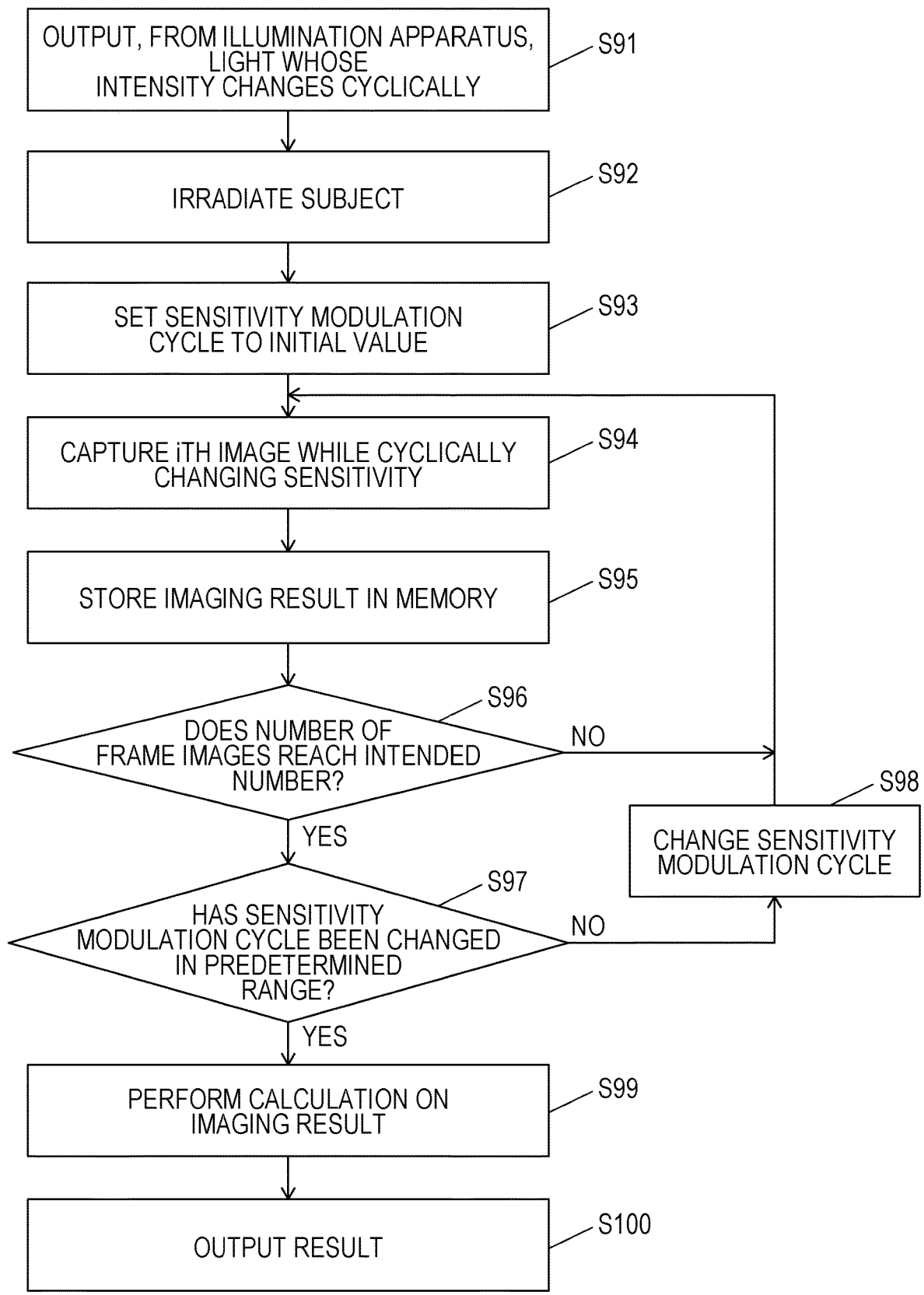
FIG. 14 is a flowchart illustrating another operation example of the imaging system in the second embodiment.

Case (2) in which the Sensitivity Modulation Cycle of the Imaging Device is Changed FIG. 14 is a flowchart illustrating an operation of the imaging system 112 when a subject is imaged through changing the sensitivity modulation cycle of the imaging device 120. This operation is used in a case in which light rays having a plurality of wavelengths are analyzed, and the intensity modulation cycles thereof are quite different from each other. In the imaging apparatus 102 in the imaging system 112, an initial value of the sensitivity modulation cycle is pre-stored in a memory or the like for the control circuit 14.

First, light whose intensity changes cyclically is emitted from the illumination apparatus 21 (S91) to be radiated onto the subject 31 (S92). Next, the control circuit 14 gives the initial value of the sensitivity modulation cycle to the imaging device 120 (S93) to cyclically change the sensitivity with the initial value, and the imaging device 120 captures an ith image (i=1, a first frame) of the subject 31 (S94). The captured image is recorded to the memory 15 (S95).

The control circuit 14 counts the number of captured images to determine whether or not the number of frame images reaches an intended number (S96). When the number of frame images does not reach the intended number, steps S94 to S96 are repeated. When the number of frame images reaches the intended number, the control circuit 14 determines whether or not the sensitivity modulation cycle used in the imaging has been changed in a predetermined range (S97). When the sensitivity modulation cycle used in the imaging has not been changed in the predetermined range, the sensitivity modulation cycle set for the imaging device 120 is changed, for example, using a predetermined increase/reduction value (S98), and steps S94 to S97 are repeated. When the sensitivity modulation cycle has been changed in the predetermined range (S97), the signal processing circuit 16 reads image data of the intended number of captured frame images from the memory 15 and calculates the cycle Tv1 of the subject's motion in the frame images by using the read image data (S99). The signal processing circuit 16 outputs a result of the calculation (S100).

<Imaging Apparatus>

In the embodiment described above, a configuration in which the imaging system 112 includes the illumination apparatus 21 has been described by way of example. However, when a subject spontaneously emits light while changing the intensity thereof, the illumination apparatus 21 may be eliminated, in which case, photography can be performed with only the imaging apparatus 102. Specifically, when the subject 31 emits light while cyclically changing the intensity thereof with a cycle Tt1, as described in the first embodiment, and the modulation cycle of the light-emission intensity of the subject in captured frame images is represented by Tv1, the relationships given by expressions (1) and (2) noted above hold between the cycle Tt1 of the light-intensity modulation of the subject and the cycle Ts1 of the sensitivity modulation, as described above in the first embodiment. Accordingly, the image data can be used to calculate the modulation cycle Tv1 of the light-emission intensity of the subject in the captured frame images and to further calculate the cycle Tt1 of the light-intensity modulation of the subject, as in the first embodiment. That is, even when the imaging device does not have a special structure, such as a structure of a high-speed imaging device, as in the first embodiment, it is possible to obtain information of, for example, the light-emission cycle of changes in a subject whose light-emission intensity changes at high speed.

The imaging apparatus, the imaging system, and the imaging method in the present disclosure can be used in various fields in which subjects are analyzed through imaging and can be used for, for example, inspection of structures and industrial products, medical applications, and so on.

What is claimed is:

1. An imaging apparatus comprising:
an imaging device that has variable sensitivity and that acquires images of a subject with a sampling cycle Tf; and
a control circuit that controls the imaging device, wherein:
the control circuit changes a sensitivity of the imaging device with a cycle Ts1 shorter than the sampling cycle Tf,
based on control of the control circuit, the imaging device acquires a plurality of images of the subject with the sampling cycle Tf,
the cycle Ts1 is different from a cycle Tt1 with which a first component included in the subject changes, and
the plurality of images includes first information that represents a difference frequency component and that is determined by Tt1·Ts1/|Tt1−Ts1|.

2. The imaging apparatus according to claim 1, wherein the sampling cycle Tf satisfies a relationship given by 2Tf<Tt1·Ts1/|Tt1−Ts1|.

3. The imaging apparatus according to claim 1, wherein:
the subject further includes a second component that changes with a cycle Tt2 different from the cycle Tt1,
the control circuit changes the sensitivity of the imaging device with a cycle Ts2 that is shorter than the cycle Ts1 and that is different from the cycle Ts1,
the plurality of images further includes second information that represents a difference frequency component and that is determined by Tt2·Ts2/|Tt2−Ts2|, and
relationships given by $$2Tf<Tt1\cdot Ts1/|Tt1-Ts1|$$

and $$2Tf<Tt2\cdot Ts2/|Tt2-Ts2|$$

are satisfied.

4. The imaging apparatus according to claim 1, wherein:
the subject further includes a second component that changes with a cycle Tt2 different from the cycle Tt1,
the plurality of images further includes third information that represents a difference frequency component and that is determined by Tt2·Ts1/|Tt2−Ts1|, and
relationships given by $$2Tf<Tt1\cdot Ts1/|Tt1-Ts1|$$

and $$2Tf<Tt2\cdot Ts1/|Tt2-Ts1|$$

are satisfied.

5. The imaging apparatus according to claim 1, wherein:
the imaging device is configured to switch between a high sensitivity state and a low sensitivity state during an exposure period, and
in the low sensitivity state, the imaging device has substantially no sensitivity.

6. The imaging apparatus according to claim 1, wherein the imaging device is configured to change the sensitivity during an exposure period between a first value and a second value in a stepwise or continuous manner, the second value being smaller than the first value.

7. The imaging apparatus according to claim 5, wherein the imaging device includes an upper electrode, a lower electrode, and a photoelectric conversion film located between the upper electrode and the lower electrode.

8. The imaging apparatus according to claim 7, wherein:
the imaging device further includes a voltage supply circuit that supplies a voltage to at least one selected from the group consisting of the upper electrode and the lower electrode, and
the control circuit controls the voltage supply circuit to cyclically change the sensitivity of the imaging device.

9. The imaging apparatus according to claim 1, wherein the imaging device acquires the images according to a global shutter system.

10. An imaging system comprising:
the imaging apparatus according to claim 1; and
a signal processing circuit that calculates the cycle Tt1 of the first component of the subject, of which image is acquired by the imaging device, based on the plurality of images.

11. An imaging system comprising:
the imaging apparatus according to claim 1; and
an actuator that cyclically applies stress to the subject, of which image is acquired by the imaging device, to change at least one selected from the group consisting of a position of the subject and a shape of the subject.

12. An imaging system comprising:
the imaging apparatus according to claim 1; and
an illumination apparatus that irradiates the subject, of which image is acquired by the imaging device, with first light having a first wavelength and having an intensity that changes with the cycle Tt1,
wherein, in the plurality of images, luminance of the first component of the subject changes with the cycle Ts1.

13. The imaging system according to claim 12, wherein the illumination apparatus further irradiates the subject with second light having an intensity that changes with a cycle different from the cycle Tt1 and having a wavelength different from the first wavelength.

14. An imaging method comprising:

modulating a sensitivity of an imaging device with a cycle Ts1; and capturing a plurality of images of a subject, which comprises a first component that changes with a cycle Tt1 different from the cycle Ts1, with a sampling cycle Tf by using the imaging device while modulating the sensitivity, wherein the plurality of images includes first information that represents a difference frequency component and that is determined by Tt1·Ts1/|Tt1−Ts1|.

15. The imaging method according to claim 14, wherein the sampling cycle Tf satisfies a relationship given by 2Tf<Tt1·Ts1/|Tt1−Ts1|.

16. The imaging method according to claim 14, wherein:

the subject further includes a second component that changes with a cycle Tt2 different from the cycle Tt1, the imaging device images the subject through changing the sensitivity with a cycle Ts2 that is shorter than the cycle Ts1 and that is different from the cycle Ts1, the plurality of images further includes second information that represents a difference frequency component and that is determined by Tt2·Ts2/|Tt2−Ts2|, and relationships given by $$2Tf < Tt1 \cdot Ts1/|Tt1-Ts1|$$

and $$2Tf < Tt2 \cdot Ts2/|Tt2-Ts2|$$

are satisfied.

17. The imaging method according to claim 14, wherein:

the subject further includes a second component that changes with a cycle Tt2 different from the cycle Tt1, the plurality of images further includes third information that represents a difference frequency component and that is determined by Tt2·Ts1/|Tt2−Ts1|, and relationships given by $$2Tf < Tt1 \cdot Ts1/|Tt1-Ts1|$$

and $$2Tf < Tt2 \cdot Ts1/|Tt2-Ts1|$$

are satisfied.

\* \* \* \* \*